US010536183B2

(12) United States Patent
Valcore, Jr. et al.

(10) Patent No.: US 10,536,183 B2
(45) Date of Patent: *Jan. 14, 2020

(54) DUAL PUSH BETWEEN A HOST COMPUTER SYSTEM AND AN RF GENERATOR

(71) Applicant: Lam Research Corporation, Fremont, CA (US)

(72) Inventors: John C. Valcore, Jr., Fremont, CA (US); Tony San, Sunnyvale, CA (US); Andrew Fong, Castro Valley, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,855

(22) Filed: Oct. 2, 2018

(65) Prior Publication Data

US 2019/0044565 A1 Feb. 7, 2019

Related U.S. Application Data

(63) Continuation of application No. 15/601,320, filed on May 22, 2017, now Pat. No. 10,103,771, which is a continuation of application No. 14/974,915, filed on Dec. 18, 2015, now Pat. No. 9,667,303.

(60) Provisional application No. 62/109,010, filed on Jan. 28, 2015.

(51) Int. Cl.
*H04B 1/40* (2015.01)
*H04L 25/02* (2006.01)

(52) U.S. Cl.
CPC ........... *H04B 1/40* (2013.01); *H04L 25/0278* (2013.01)

(58) Field of Classification Search
CPC ...... H04B 1/40; H04B 1/3888; H04L 25/0278
USPC .................................................. 375/219–222
See application file for complete search history.

(56) References Cited

U.S. PATENT DOCUMENTS

| | | | |
|---|---|---|---|
| 9,667,303 B2 * | 5/2017 | Valcore, Jr. ......... | H04L 25/0278 |
| 10,103,771 B2 * | 10/2018 | Valcore, Jr. ......... | H04L 25/0278 |
| 2015/0261416 A1 * | 9/2015 | Thomas ................. | G06F 9/451 715/771 |
| 2015/0277935 A1 * | 10/2015 | Desimone ............. | G06F 9/4411 710/313 |

* cited by examiner

*Primary Examiner* — Emmanuel Bayard
(74) *Attorney, Agent, or Firm* — Penilla IP, APC

(57) ABSTRACT

A system and a method for increasing a rate of transfer of data between a radio frequency (RF) generator and a host computer system is described. The rate of transfer of data is increased by implementing dedicated physical layers associated with the RF generator and the host computer system and a dedicated physical communication medium between the RF generator and the host computer system. Moreover, a dual push operation is used between the RF generator and the host computer system. There is no request for data sent from the RF generator to the host computer system or from the host computer system to the RF generator.

20 Claims, 13 Drawing Sheets

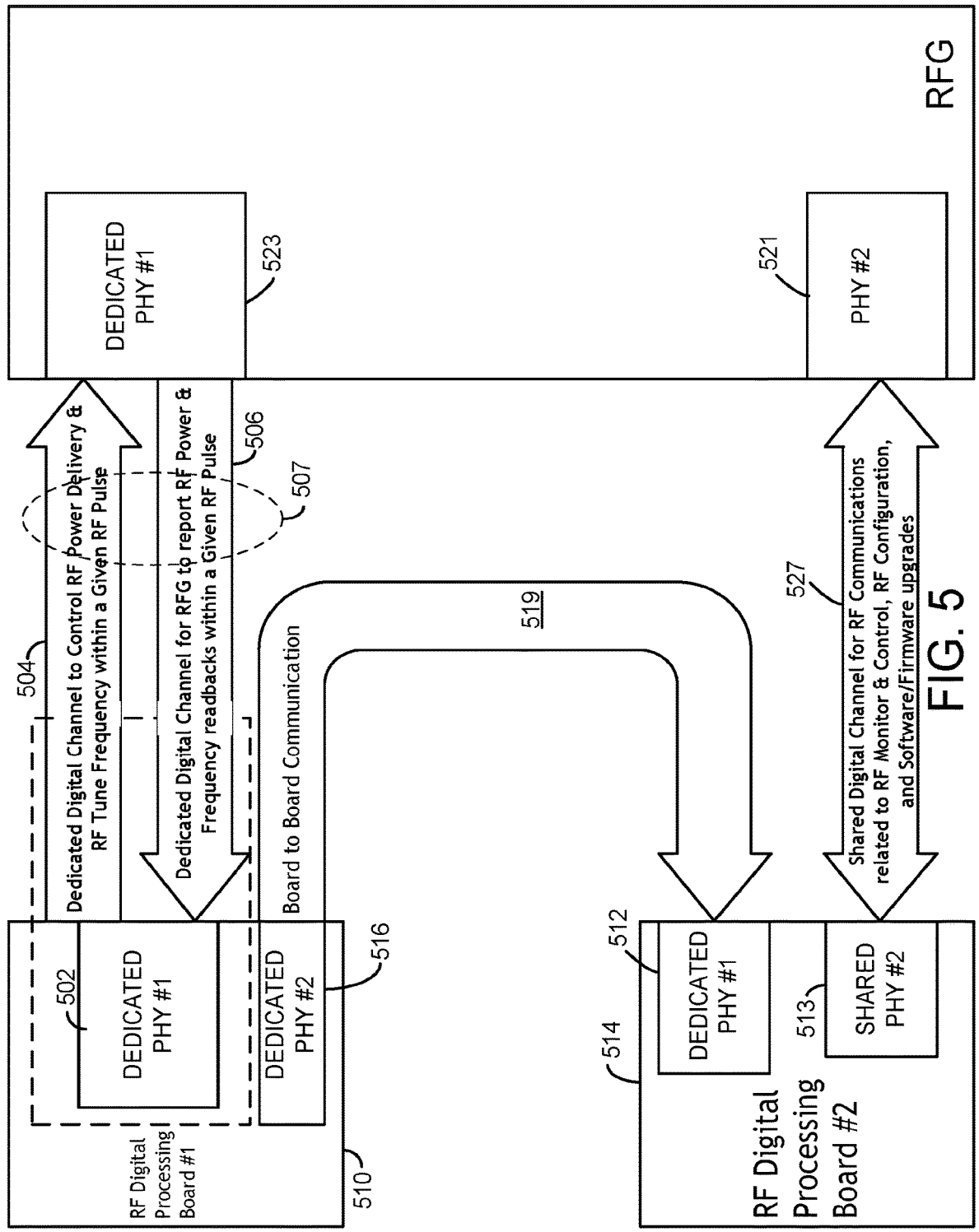

| Description | Frame Index | #bytes |
|---|---|---|
| Power Set point, State 0 | 1 | M |
| Frequency Set point, State 0 | 2 | M |
| Pulse Width Set point, State 0 | 3 | M |
| Power Set point, State 1 | 4 | M |
| Frequency Set point, State 1 | 5 | M |
| Pulse Width Set point, State 1 | 6 | M |
| Power Set point, State 2 | 7 | M |
| Frequency Set point, State 2 | 8 | M |
| Pulse Width Set point, State 2 | 9 | M |
| Power Set point, State 3 | 10 | M |
| Frequency Set point, State 3 | 11 | M |
| Pulse Width Set point, State 3 | 12 | M |
| Power Set point, State (n-1) | 13 | M |
| Frequency Set point, State (n-1) | 14 | M |
| Pulse Width Set point, State (n-1) | 15 | M |
| Power Set point, State n | 16 | M |
| Frequency Set point, State n | 17 | M |
| Pulse Width Set Point, State n | 18 | M |
| RF Mode Vector 1 | 19 | M |
| RF Mode Vector 2 | 20 | M |

| Description | Frame Index | #bytes |
|---|---|---|
| Reserve Vector 1 | 21 | M |
| Reserve Vector 2 | 22 | M |
| Reserve Vector 3 | 23 | M |
| Reserve Vector 4 | 24 | M |
| Reserve Vector 5 | 25 | M |
| Reserve Vector 6 | 26 | M |
| Reserve Vector 7 | 27 | M |
| Reserve Vector 8 | 28 | M |
| Reserve Vector 9 | 29 | M |
| Reserve Vector 10 | 30 | M |
| Reserve Vector 11 | 31 | M |
| Reserve Vector 12 | 32 | M |
| Reserve Vector N... | 33 | M |
| Reserve Vector 44 | 34 | M |

Dual UDP Push Control Strategy: RF Control Datagram

RF Generator Control Frame: 256 bytes

FIG. 6

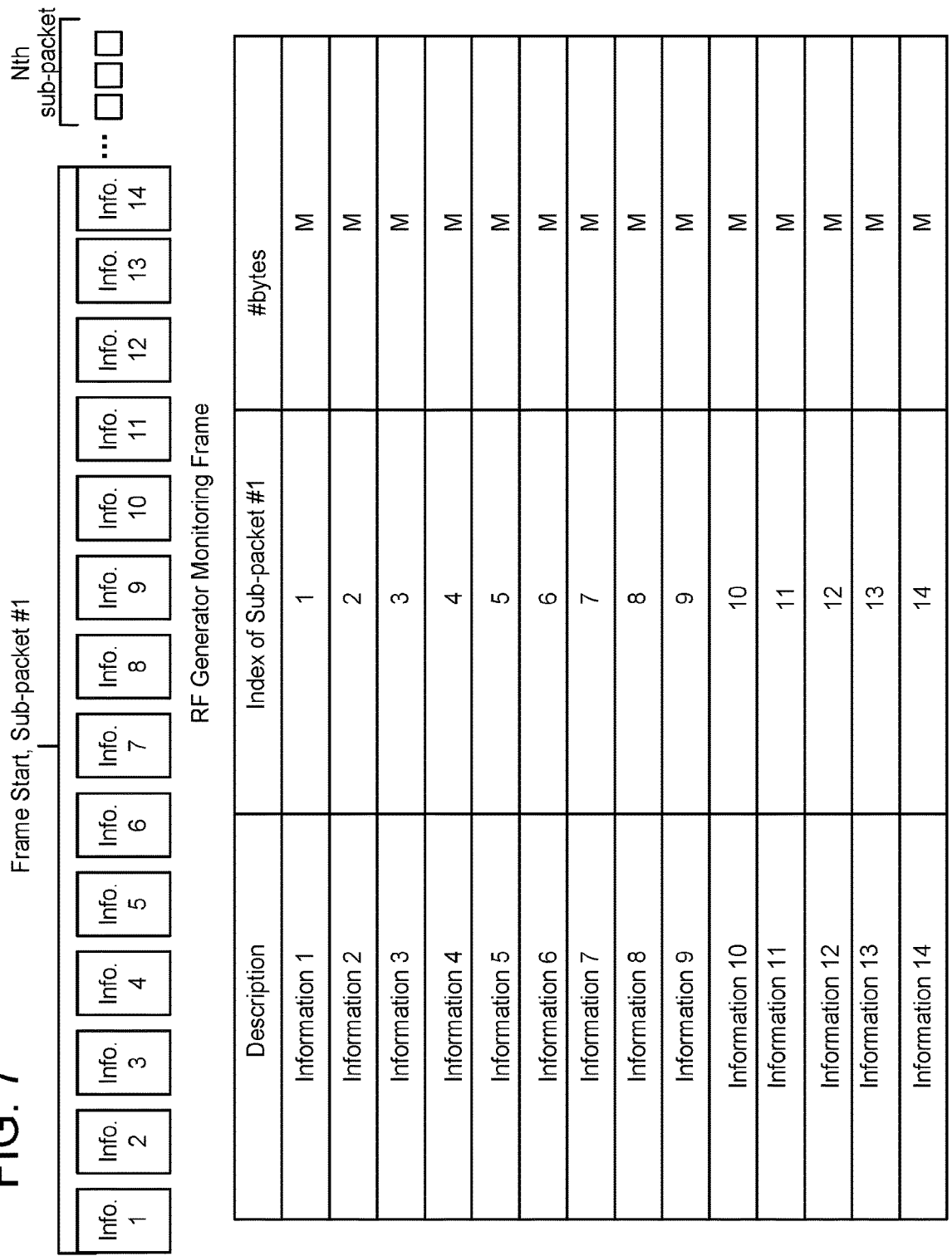

Timing Diagram for Dual UDP Push with RFG

DUAL PUSH BETWEEN A HOST COMPUTER SYSTEM AND AN RF GENERATOR

CLAIM OF PRIORITY

The present patent application is a continuation of and claims the benefit of and priority, under 35 U.S.C. § 120, to U.S. patent application Ser. No. 15/601,320, filed on May 22, 2017, and titled "Dual Push between a Host Computer System and an RF Generator", which is a continuation of and claims the benefit of and priority, under 35 U.S.C. § 120, to U.S. patent application Ser. No. 14/974,915, filed on Dec. 18, 2015, titled "Dual Push between a Host Computer System and an RF Generator", and now issued as U.S. Pat. No. 9,667,303, which claims the benefit of and priority, under 35 U.S.C. § 119(e), to U.S. Provisional Patent Application No. 62/109,010, filed on Jan. 28, 2015, and titled "Dual Push between a Host Computer System and an RF Generator", all of which are incorporated by reference herein in their entirety for all purposes.

FIELD

The present embodiments relate to systems and methods for a dual push between a host computer system and a radio frequency (RF) generator.

BACKGROUND

In a plasma system, multiple radio frequency (RF) generators are connected to a plasma chamber. An RF generator is controlled by a computer. For example, the computer provides values associated with an RF signal that is generated by the RF generator. The RF generator uses the values to generate the RF signal, which is then sent to the plasma chamber. Plasma is generated in the plasma chamber upon reception of the RF signal.

Communication between the RF generator and the computer is slow. This slow communication hinders efficient control by the computer of the RF generator.

It is in this context that embodiments described in the present disclosure arise.

SUMMARY

Embodiments of the disclosure provide apparatus, methods and computer programs for a dual push between a host computer system and a radio frequency (RF) generator. It should be appreciated that the present embodiments can be implemented in numerous ways, e.g., a process, an apparatus, a system, a device, or a method on a computer readable medium. Several embodiments are described below.

In some embodiments, the dual push between the host system and the RF generator allows faster communication between the host system and the RF generator compared to another transfer protocol, e.g., Ethernet for control automation technology (EtherCAT) protocol, Transmission Control Protocol over Internet Protocol (TCP/IP), etc. The EtherCAT protocol is limited in response time and net load, e.g., number of slaves, etc. Moreover, the TCP/IP protocol has overhead associated with packet retry and timeout. The other transfer protocol involves error-checking for errors in packets, communication of indication of the error, and re-transmission of a packet. The error-checking, communication of the indication of the error, and the re-transmission consumes time. The dual push applies a communication protocol, e.g., a universal datagram protocol (UDP), a customized protocol etc., that continuously pushes transfer units, e.g., packets, etc., between the host system and the RF generator. For example, no error-checking for each packet is performed by a receiver of the packet, no communication of an indication of the error is performed by the receiver, and no re-transmission is performed by a transmitter of the packet. As another example, none of the packets are sent again and no confirmation is received from a receiver that a packet is received. As yet another example, there is no request by the host system for information associated with one or more parameters from the RFG and there is no request by the RFG for one or more set points of one or more parameters from the host system. Once, the RFG is configured to send the information associated with one or more parameters by the host computer, the RFG sends one or more packets to the host computer and the host computer analyzes the information associated with one or more parameters stored in the one or more packets to determine whether to send modified set points or to send the same set points as that sent previously to the RFG.

In some embodiments, a dual push utilizes an Ethernet stack for pushing a first fixed UDP datagram for monitoring an output of an RF generator and utilizes an Ethernet stack for pushing a second fixed UDP datagram for controlling the RF generator.

In various embodiments, in a dual push apparatus, the host system and the RF generator are connected to each other via dedicated communication links of a physical communication medium and dedicated transmitters and dedicated receivers. For example, a dedicated transmitter of the host system is connected via a dedicated communication link of the physical communication medium to a dedicated receiver of the RF generator and a dedicated transmitter of the RF generator is connected via a dedicated communication link of the physical communication medium to a dedicated receiver of the host system. The dedicated receiver of the host system applies the communication protocol to a packet received from the dedicated transmitter of the RF generator to extract the information associated with one or more parameters within the packet. The information associated with one or more parameters is provided to a processor of the host system. The processor generates a value of a parameter from the information associated with one or more parameters and determines whether the value is within a pre-determined range of a value of the parameter sent previously to the dedicated receiver of the RF generator. Upon determining that the value is not within the pre-determined range, the processor modifies a value of the parameter to be within the pre-determined range and provides the value to the dedicated transmitter of the host system for communicating to the dedicated receiver of the RF generator via the dedicated communication link of the physical communication medium. As another example, a 1-gigabit physical layer pushes a 512 byte frame to a dedicated client that also has a 1-gigabit physical layer for reception of the frame. The pushing is done to achieve a speed of 100 kilohertz.

In some embodiments, the non-performance by the dual push apparatus of error-checking, of communication of the indication of the error, and of re-transmission of a packet that has the error saves time and cost.

Moreover, in various embodiments, the dedicated communication links reduce chances of packets from different source ports colliding and dropping. The dedicated communication links are not shared between different RF generators or different controllers reduce the chances of packets colliding and dropping. For example, if packets are sent to two different RF generators via a shared communication link, there may be collision between the packets, resulting in loss or error in data that is sent to the RF generators. By using a dedicated communication link that is connected to one RF generator, the host system cannot send packets to a different RF generator via the dedicated communication link to prevent the collision.

Additional advantages of the dual push apparatus include an increase by multiple times, e.g., 100 times, 1000 times, 100 thru 1000 times, etc., in response time of a response by an RF generator to a controller of the host system or by the controller to the RF generator compared to another protocol, e.g., the EtherCAT protocol, TCP/IP, etc.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 5 is a diagram of a system to illustrate a communication of data between a local processor board system and an RFG and between the local processor board system and another processor board system, in accordance with an embodiment described in the present disclosure.

FIG. 6 is a diagram to illustrate a payload of a transfer unit that is generated and sent by a dedicated transmitter of a controller of a host computer system to an RF generator, in accordance with an embodiment described in the present disclosure.

FIG. 7 is a diagram to illustrate a payload of a transfer unit that is generated and sent by a dedicated transmitter of an RFG to a controller of the host computer system, in accordance with an embodiment described in the present disclosure.

DETAILED DESCRIPTION

The following embodiments describe systems and methods for a dual push between a host computer system and a radio frequency (RF) generator. It will be apparent that the present embodiments may be practiced without some or all of these specific details. In other instances, well known process operations have not been described in detail in order not to unnecessarily obscure the present embodiments.

In some embodiments, the dual push is performed when there is no request sent from the host computer system to the RF generator for information associated with one or more parameters and no request sent from the RF generator to the host computer system for one or more set points, e.g., one or more values, etc., of the one or more parameters. The RF generator is configured by the host computer system to send one or more packets having the information associated with one or more parameters and once the RF generator is configured, the RF generator initiates and continues to send the one or more packets. Once the host computer receives the one or more packets, the host computer determines whether to modify the one or more set points, and based on the determination, sends one or more packets that include either the one or more set points that are not modified or one or more modified set points to the RFG. In several embodiments, a push is a transmission of data by a sender without a receiver of the data requesting the data.

In various embodiments, the RFG and a co-controller of the host computer system are connected with each other via a dedicated physical layer connected to the co-controller, via a dedicated physical communication medium connecting the RFG to the host computer system, and via a dedicated physical layer connected to a dedicated processor of the RFG. The dedicated physical layers of the RFG and the host computer system and the dedicated physical communication medium facilitates a fast transfer of data between the RFG and the host computer system. There is no need for error-checking, or re-sending of packets that have errors, etc., between the RFG and the host computer system.

Figure 1A:
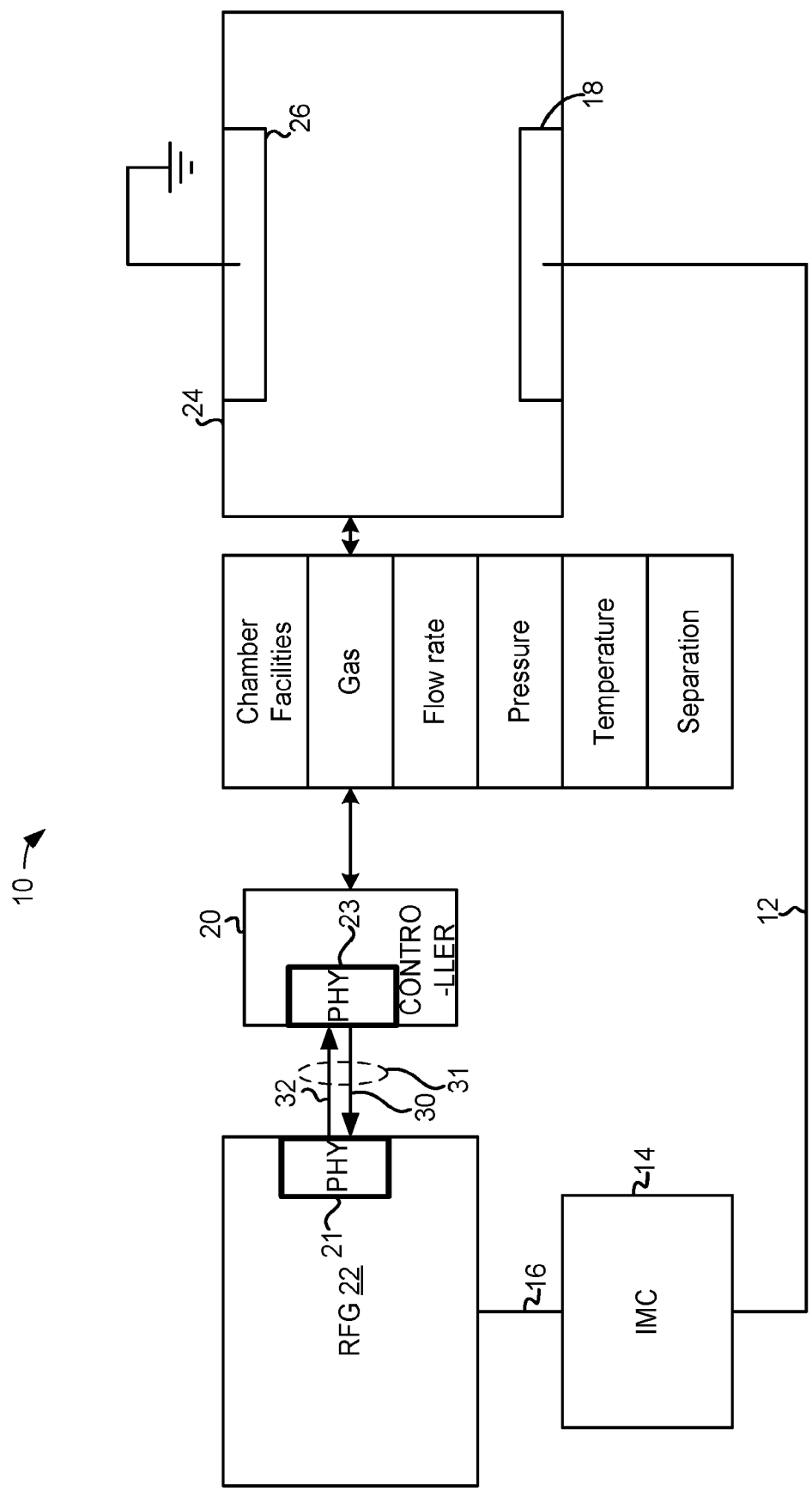
FIG. 1A is a diagram of a plasma system for using a dual push between a controller and a radio frequency generator (RFG), in accordance with an embodiment described in the present disclosure.

FIG. 1A is a diagram of an embodiment of a plasma system 10 for using the dual push between a controller 20, e.g., a local controller, etc., and an RF generator (RFG) 22. The plasma system 10 includes the RFG 22, an impedance matching circuit (IMC) 14, the controller 20, and a plasma chamber 24. The plasma chamber 24 is connected to the IMC 14 via an RF transmission line 12. The RFG 22 is connected to the IMC 14 via an RF cable 16. In some embodiments, examples of a controller include a CPU, a computer, a processor, a microprocessor, an application specific integrated circuit (ASIC), and a programmable logic device (PLD). In various embodiments, a controller includes a combination of a processor and a memory device. Examples of a memory device include a read-only memory (ROM), a random access memory (RAM), a hard disk, a volatile memory, a non-volatile memory, a redundant array of storage disks, a Flash memory, etc.

The controller 20 generates a control signal to the RFG 22 and the control signal includes one or more set points, e.g., values, etc., of one or more parameters, e.g., frequency, power, etc., for one or more states, e.g., a state S1, a state S2, a state S3, a state S4, etc., to the RFG 22. A dedicated transmitter (Tx) of a dedicated physical layer 23 of the controller 20 applies a communication protocol, e.g., a universal datagram protocol (UDP), a UDP over Internet Protocol (UDP over IP), UDP over IP over Ethernet, a customized protocol, etc., to the control signal to generate one or more transfer units, e.g., datagrams, UDP datagrams, packets, etc., and sends the one or more transfer units via a dedicated communication link 30 to the RFG 22 during a clock cycle CA. The dedicated communication link 30 is a part of a physical communication medium 31. In various embodiments, examples of a physical communication medium include a coaxial cable, a conductor cable, a wired medium, a twisted pair, a fiber optic link, a cable, an Ethernet cable, a wireless medium, etc.

In some embodiments, a dedicated communication link is used to perform point-to-point communication between two devices, e.g., a dedicated physical layer 23 of the controller 20 and a dedicated physical layer 21 of the RFG 22, etc. For example, the dedicated communication link 30 is a channel of one or more transfer units for sending one or more set points of one or more parameters from the physical layer 23 of the controller 20 to the dedicated physical layer 21 of the RFG 22 and a dedicated communication link 32 is a channel of one or more transfer units for sending from the physical layer 21 of the RFG 22 to the physical layer 23 of the controller 20. In various embodiments, a channel is a logical connection used to convey data over a cable and has a capacity that is measured in bits per second.

In some embodiments, a physical layer is a port, e.g., an Ethernet port, a UDP port, a communication port, etc. In various embodiments, a dedicated physical layer transfers, e.g., sends, receives, etc., at a rate in an order of gigabits per second (Gbps). In various embodiments, a dedicated physical layer is a communication device, e.g., a transceiver, etc., that transfers, e.g., sends, receives, etc., one or more transfer units at a rate of gigabits per second or a rate higher than gigabits per second, e.g., at a rate of terabits per second (Tbps), etc.

A clock cycle is of a clock signal that is generated by a clock source that is located within the controller 20 or outside the controller 20. Examples of a clock source include an oscillator, an oscillator with a phase-locked loop, etc. In some embodiments, the clock source that generates the clock signal is located in an RFG or a controller. For example, the clock source is located within the controller 20 and provides the clock signal to the RFG 22 or other RFGs connected to and controlled by the controller 20.

In some embodiments, a state, referred to herein, is of an RF signal that is generated by an RF generator. A state is distinguished from another state by a controller. For example, a state of an RF signal has multiple power values that are exclusive from multiple power values of another state of the RF signal. The multiple power values of a state have a different level than multiple power values of another state so that during a pre-defined period of time during a clock cycle, there is a difference between the two levels.

In several embodiments, a state of an RF signal is synchronized with a state of a clock signal. For example, a clock signal has a high level, e.g., a bit 1, etc., and a low level, e.g., a bit 0, etc. The RF signal, which is sinusoidal, transitions between the two states when the clock signal transitions between the two states. To illustrate, when the clock signal is at the high level, the RF signal is at a high level. When the clock signal transitions from the high level of the clock signal to the low level of the clock signal, the RF signal transitions from the high level of the RF signal to a low level of the RF signal. When the clock signal is at the low level of the clock signal, the RF signal is at the low level of the RF signal. When the clock signal transitions from the low level of the clock signal to the high level of the clock signal, the RF signal transitions from the low level of the RF signal to the high level of the RF signal.

In various embodiments, an RF signal has any number of states. For example, when the clock signal is at the high level, the RF signal transitions between different levels and when the clock signal is at the low level, the RF signal has one state. As another example, when the clock signal is at the low level, the RF signal transitions between different levels and when the clock signal is at the high level, the RF signal has one state. As yet another example, when the clock signal is at the high level, the RF signal transitions between different levels and when the clock signal is at the low level, the RF signal transitions between different levels.

The physical layer 21 of the RFG 22 includes a dedicated receiver (Rx) that receives one or more transfer units via the dedicated communication link 30 and applies the communication protocol to extract the control signal from the transfer units. The dedicated receiver of the RFG 22 is a part of the dedicated physical layer 21 of the RFG 22. A dedicated processor, e.g., a digital signal processor (DSP), a field programmable gate array, an application specific integrated circuit, etc., of the RFG 22 parses the control signal to distinguish one or more set points of one or more parameters for a state from one or more set points of one or more parameters for another state. The dedicated processor of the RFG 22 provides one or more set points of one or more parameters for one state to a parameter controller, e.g., an auto-frequency tuner (AFT), a power controller, etc., and one or more set points of the parameter for another state to another parameter controller, e.g., an AFT, a power controller, etc. Each parameter controller associated with a state drives, via a driver, e.g., a transistor, a group of transistors, etc., an RF power supply, e.g., an RF power source, etc., of the RFG 22 to generate an RF signal having the states.

The RF signal having multiple states is sent from the RFG 22 via the RF cable 16 to the IMC 14. The IMC 14 matches an impedance of a load connected to an output of the IMC 14 with that of a source connected to an input of the IMC 14 to generate a modified RF signal. Examples of the source include one or more RF generators that are coupled to the IMC 14 via corresponding RF cables and that are operational, and further include the RF cables that couple the RF generators to the IMC 14. Examples of the load include the RF transmission line 12 and the plasma chamber 24.

The IMC 14 provides the modified RF signal via the RF transmission line 12 to a chuck 18 of the plasma chamber 24. At a time the modified RF signal is supplied from the IMC 14 to the chuck 18, a process gas, e.g., an oxygen-containing gas, a fluorine-containing gas, a gas containing carbon and fluorine, etc. is supplied between an upper electrode 26 of the plasma chamber 24 and the chuck 18 via gas inlets in the upper electrode 26. An example of the oxygen-containing gas includes oxygen and examples of the fluorine-containing gas include tetrafluoromethane ($CF_4$), sulfur hexafluoride ($SF_6$), hexafluoroethane ($C_2F_6$), $C_4F_6$ gas, $C_4F_3$ gas, $C_3F_8$ gas, etc. When both the process gas and the modified RF signal are supplied to the plasma chamber 24, plasma is generated or is maintained within the plasma chamber 24.

The plasma is used to perform one or more operations, e.g., etching, doping, ion implantation, cleaning, deposition, photolithographic patterning, etc., on a substrate, e.g., a wafer, etc., to form integrated circuits on the substrate. The integrated circuits are then diced and packaged, and used in a variety of electronic devices, e.g., cell phones, computers, tablets, cameras, exercise equipment, watches, etc.

In some embodiments, the RFG 22 includes one or more sensors, e.g., voltage sensors, current sensors, complex impedance sensors, power sensors, etc., that sense, e.g., detect, measure, etc., a characteristic, e.g., power, voltage, current, impedance, etc., of the RF signal that is sent from an output node of the RFG 22. The one or more sensors are connected to the output node of the RFG 22 and the RF signal is provided by the RF generator 22 at the output.

In some embodiments, the one or more sensors are connected to any other portion of the plasma system 10 to measure a characteristic of an RF signal at that portion.

The dedicated processor of the RFG 22 determines, e.g., identifies, calculates, etc., the information associated with one or more parameters from the characteristic of the RF signal generated by the RFG 22 or from a value of a parameter received from the controller 20. Examples of information associated with one or more parameters include a value of supplied power, a value of delivered power, a value of reflected power, a value of a real part of gamma, a value of an imaginary part of gamma, a value of a voltage standing wave ratio (VSWR), an amount of time elapsed from a clock edge of a clock signal, a set point within a controller of the RFG 22, a status vector, e.g., an alarm vector, etc., used to determine whether the information is outside a pre-determined range, a measured value of the parameter, a value of the parameter that is received from the controller 20, a combination thereof, etc. To illustrate, delivered power is calculated as a difference between supplied power and reflected power. The set point within the controller of the RFG 22 is received from the controller 20 via the dedicated communication link 30. The supplied power is power supplied from the output of the RFG 22 to the IMC 14 via the RF cable 16. The reflected power is power reflected from the plasma chamber 24 via the RF transmission line 12 and the IMC 14 to the output of the RFG 22. As another illustration, a relationship between a reflected power signal and a supplied power signal is determined to generate values of gamma.

A dedicated transmitter (Tx) of the physical layer 21 of the RFG 22 applies the communication protocol to the information associated with one or more parameters to generate one or more transfer units, and sends during a clock cycle CB or during the clock cycle CA the one or more transfer units via the dedicated communication link 32 to a dedicated receiver Rx of the physical layer 23 of the controller 20. The dedicated communication link 32 is a part of the physical communication medium 31. In various embodiments, having the dedicated communication links 30 and 32 of the physical layer 31 reduces chances of collision of packets. For example, when packets are sent along a shared communication link between the controller 20 and multiple RFGs, including the RFG 22, there is collision between the packets and some of the packets are lost as a result of the collision. The dedicated communication links 30 and 32 between the RFG 22 and the controller 20 reduce chances of such collision. For example, packets cannot be sent between another RFG, other than the RFG 22, and the controller 20, and so, chances of the collision are reduced.

A dedicated receiver Rx of the physical layer 23 of the controller 20 applies the communication protocol to one or more transfer units including the information associated with one or more parameters to extract the information, and sends the information to a processor of the controller 20. The processor of the controller 20 processes the information associated with one or more parameters. For example, the processor of the controller 20 calculates or identifies a value of a parameter for a state of an RF signal from the information, e.g., calculates supplied power from delivered power and reflected power, calculates supplied power from gamma and reflected power, identifies measured power, identifies the set point within the controller of the RFG 22, identifies that the status vector indicates a fault, etc., and compares the value of the parameter with a value of the parameter sent during the clock cycle CA to the RFG 22 via the dedicated communication link 30. The processor of the controller 20 determines whether the calculated value of a parameter for a state of an RF signal is within the pre-determined range of the value of the parameter for the state previously sent during the clock cycle CA to the RFG 22 via the dedicated communication link 30. Upon determining that the calculated value of a parameter is within the pre-determined range of the value of the parameter previously sent during the clock cycle CA to the RFG 22, the processor of the controller 20 determines not to change the value of the parameter previously sent to the RFG 22. On the other hand, upon determining that the calculated value of a parameter is outside the pre-determined range of the value of the parameter previously sent during the clock cycle CA to the RFG 22, the processor of the controller 20 determines to change a value of the parameter for the same state of the RF signal as that for which the value of the parameter is previously sent to the RFG 22.

Such comparison of parameter values allows the controller 20 and the RFG 22 to push data at a high rate without waiting to check accuracy of the data, without waiting for re-transmission of the same packet, and without an indication of a timeout. For example, an acknowledgement of whether a packet is received by the RFG 22 from the controller 20 is not generated by the dedicated receiver of the physical layer 21 of the RFG 22 and an acknowledgement whether a packet is received by the controller 20 from the RFG 22 is not generated by the dedicated receiver of the physical layer 23 of the controller 20. As another example, there is no indication of a timeout by the controller 20 to itself when an acknowledgment of a packet sent from the controller 20 to the RFG 22 is not received by the controller 20 from the RFG 22 within a pre-determined time period. As another example, there is no indication of a timeout by the RFG 22 to itself when an acknowledgment of a packet sent from the RFG 22 to the controller 20 is not received by the RFG 22 from the controller 20 within a pre-determined time period. In some embodiments, a timeout initiates a re-transmission of a packet by a sender of the packet.

In various embodiments, the dedicated transmitter Tx of the physical layer 21 of the RFG 22 sends the information regarding one or more parameters during the same clock cycle CA in which one or more transfer units used to generate the information are received by the dedicated receiver Rx of the RFG 22.

In some embodiments, a pre-determined number of clock cycles exist between the clock cycles CA and CB. For example, a number of one or more clock cycles occur during which an RF signal is generated by the RFG 22 from a parameter received during the clock cycle CA, during which the one or more sensors sense the characteristic of the RF signal, and during which the dedicated processor of the RFG 22 determines the information associated with the parameter from the characteristic. The clock cycles are located between the clock cycle CB and the clock cycle CA. In some embodiments, during the pre-determined number of clock cycles between CA and CB, the dedicated transmitter Tx of the physical layer 23 of the controller 20 continues to send one or more transfer units to the RFG 22 via the dedicated communication link 30.

In several embodiments, the information associated with one or more parameters includes one or more bits indicating whether a value of a parameter that is sent previously during the clock cycle CA by the dedicated transmitter of the physical layer 23 of the controller 20 is received by the dedicated receiver of the physical layer 21 of the RFG 22. The processor of the controller 20 determines from the one or more bits whether or not the dedicated receiver of the RFG 22 received the value of the parameter. For example, the processor of the controller 20 compares the bits to value of the parameter sent to the RFG 22 during the clock cycle CA previously and upon determining that there is a match between the bits and the value, the processor determines that the RFG 22 received the value of the parameter sent during the clock cycle CA. On the other hand, upon determining that there is no a match between the bits and the value, the processor determines that the RFG 22 did not receive the value of the parameter sent during the clock cycle CA.

In various embodiments, the information associated with one or more parameters includes a measured value of the parameter. For example, the RFG 22 includes one or more sensors that measure a value of a parameter and the measured value is sent from the RFG 22 to the controller 20 by applying the communication protocol. The measured value is compared by the controller 20 to a value of the parameter that is previously sent during the clock cycle CA to the RFG 22 to determine whether the value of the parameter is received previously by the RFG 22. For example, the processor of the controller 20 processes the information regarding the parameter to determine whether the calculated value of a parameter is within a pre-determined range of the value of the parameter previously sent to the RFG 22 during the clock cycle CA via the dedicated communication link 30. Upon determining that the measured value for a state is within the pre-determined range of the value of the parameter for the state that is previously sent during the clock cycle CA to the RFG 22, the processor of the controller 20 does not change the value of the parameter for the state for sending to the RFG 22 during a clock cycle, e.g., the clock cycle CA, the clock cycle CB, or a next clock cycle CC. The next clock cycle CC occurs after the clock cycle CB. On the other hand, upon determining that the measured value for the state is not within the pre-determined range of the value of the parameter for the state that is previously sent during the clock cycle CA to the RFG 22, the processor of the controller 20 changes the value of the parameter for the state to be within the pre-determined range for sending to the RFG 22 via the dedicated communication link 30 during the next clock cycle.

In some embodiments, the information associated with one or more parameters includes a set point of a parameter that is sent previously during the clock cycle CA by the dedicated transmitter of the physical layer 23 of the controller 20 to the dedicated receiver of the physical layer 21 of the RFG 22. The processor of the controller 20 determines from the set point whether or not the dedicated receiver of the physical layer 21 of the RFG 22 previously received during the clock cycle CA the set point of the parameter. For example, upon determining that s set point of a parameter for a state received by the controller 20 from the RFG 22 is within s pre-determined range of a value of a parameter that is previously sent during the clock cycle CA by the controller 20 to the RFG 22, the processor of the controller 20 determines not to change the set point of the parameter for the state for sending to the RFG 22 during the next clock cycle. On the other hand, upon determining that the set point of the parameter for the state received by the controller 20 from the RFG 22 is outside the pre-determined range of the value of the parameter that is previously sent by the controller 20 to the RFG 22, the processor of the controller 20 determines to change the set point of the parameter for the state to be within the pre-determined range for sending to the RFG 22 during the next clock cycle.

In several embodiments, upon determining that the information associated with one or more parameters is outside a pre-determined range of a value of a set point previously sent during the clock cycle CA from the controller 20 to the RFG 22, the processor of the controller 20 generates alarm data. The alarm data is rendered by the processor of the controller 20 on a display device to display to a user or is displayed in a form of a blinking light emitter or is provided in a form of an audio output to inform a user that a portion of the plasma system 10, e.g., one or more components within the RFG 22, or one or more components within the plasma chamber 24, or one or more components within the IMC 14, or a combination thereof, etc., is malfunctioning or is not operating.

In some embodiments, the dedicated processor of the RFG 22 determines whether the information associated with one or more parameters is outside a pre-determined range of a value of a set point previously sent during the clock cycle CA to the RFG 22. Upon determining that the information associated with one or more parameters is outside the pre-determined range of a value of a set point previously sent during the clock cycle CA to the RFG 22, the dedicated processor of the RFG 22 generates alarm data. The alarm data is sent to the dedicated transmitter of the physical layer 21 of the RFG 22 by the dedicated processor of the RFG 22. The dedicated transmitter Tx of the physical layer 21 of the RFG 22 generates one or more transfer units that include the alarm data as payload and sends the one or more transfer units to the dedicated receiver of the physical layer 23 of the controller 20. The dedicated receiver of the physical layer 23 of the controller 20 receives the one or more transfer units and parses the one or more transfer units to extract the alarm data. The alarm data is provided from the dedicated receiver of the controller 20 to the processor of the controller 20, and the processor of the controller 20 renders the alarm data on a display device to display to a user or displays the alarm data in a form of a blinking light emitter or provides the audio data in the form of an audio output to inform the user that a portion of the plasma system 10 is malfunctioning or is not operating In several embodiments, the controller 20 provides chamber facilities, e.g., type of gas to be provided to the plasma chamber 24, flow rates of flow of a process gas into the plasma chamber 24, pressure within the plasma chamber 24, separation between the chuck 18 and the upper electrode 26, etc. to control a variety of mechanisms, e.g., drivers for driving motors that controls movement of the upper electrode 26 and of the chuck 18 to control separation between the upper electrode 26 and the chuck 18, a power source for providing power to a heater to control temperature within the plasma chamber 24, a driver for driving a valve that controls a flow rate of a process gas into the plasma chamber 24, a driver for driving a motor that controls movement of confinement rings for controlling pressure within the plasma chamber 24, etc.

In various embodiments, a dedicated receiver, e.g., the receiver of the physical layer 21, the receiver of the physical layer 23, etc., that applies the communication protocol does not apply error checking to a transfer unit and does not indicate the error to a dedicated transmitter, e.g., the transmitter of the physical layer 21, the transmitter of the physical layer 23, etc., that sent the transfer unit. For example, a dedicated receiver does not apply a checksum to a transfer unit. As another example, a dedicated receiver does not send a transfer unit including a message that another transfer unit is not received from a dedicated transmitter. Such exclusion of error checking and correction saves time in the real-time dynamic plasma system 10 and increases data rate associated with the plasma system 10.

In some embodiments, a dedicated receiver, as used herein, is a component of a transceiver circuit that applies the communication protocol to one or more transfer units to extract one or more set points of one or more parameters or to extract the information associated with one or more parameters. In these embodiments, the dedicated receiver includes a memory device, e.g., a buffer, a queue, etc., to store the extracted one or more set points or the extracted information associated with one or more parameters to be read by a processor of a controller or a dedicated processor connected to the dedicated receiver.

In various embodiments, a dedicated transmitter, as used herein, is a component of a transceiver circuit that applies the communication protocol to one or more set points of one or more parameters or to the information associated with one or more parameters to generate one or more transfer units. In these embodiments, the dedicated transmitter includes a memory device, e.g., a buffer, a queue, etc., to receive the one or more set points or the information associated with one or more parameters from a processor of a controller or a dedicated processor connected to the dedicated transmitter for generating the one or more transfer units.

In several embodiments, a physical layer, as used herein, is a transceiver or a device that includes both a transmitter circuit and a receiver circuit or a communication device that applies the communication protocol.

Figure 1B:
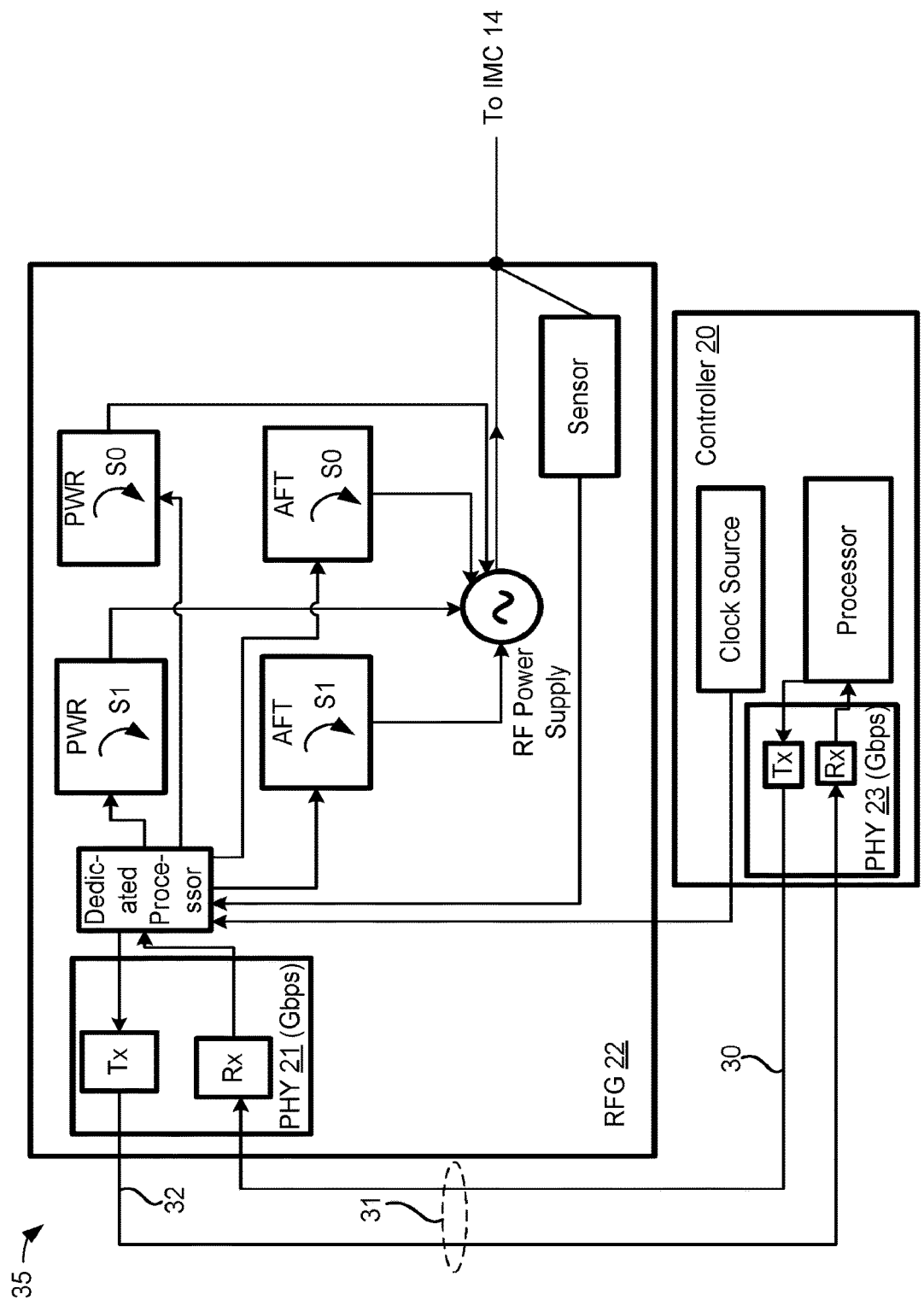
FIG. 1B is a diagram of an embodiment of the controller and the RFG of the plasma system of FIG. 1A to illustrate a communication between the controller and the RFG, in accordance with an embodiment described in the present disclosure.

FIG. 1B is a diagram of an embodiment of a system 35 to illustrate communication between the controller 20 and the RFG 22. A processor of the controller 20 generates one or more set points of one or more parameters and provides the one or more set points to the dedicated transmitter Tx of the physical layer 23 of the controller 20. The dedicated transmitter of the physical layer 23 of the controller 20 applies the communication protocol to the one or more set points to generate one or more transfer units and sends the one or more transfer units during the clock cycle CA via the dedicated communication link 30 to the receiver port Rx of the physical layer 21 of the RFG 22. The receiver port Rx of the physical layer 21 of the RFG 22 applies the communication protocol to the one or more transfer units to extract the one or more set points and provides the one or more set points to the dedicated processor of the RFG 22.

The dedicated processor determines from the one or more set points whether a set point corresponds to a state S0 or S1 of an RF signal and whether the set point is a frequency value or a power value. Moreover, the dedicated processor determines whether a clock signal that is received from the clock source has the state S1 or the state S0. Upon determining that the set point is for the state S1 of an RF signal and has a power value and upon determining that the clock signal indicates the state S1, the dedicated processor sends the set point to a power controller PWR S1. On the other hand, upon determining that the set point is for the state S0 of an RF signal and has a power value and upon determining that the clock signal indicates the state S0, the dedicated processor sends the set point to a power controller PWR S0. Moreover, upon determining that the set point is for the state S1 of an RF signal and has a frequency value and upon determining that the clock signal indicates the state S1, the dedicated processor sends the set point to an auto frequency tuner (AFT) AFT S1. Upon determining that the set point is for the state S0 of an RF signal and has a frequency value and upon determining that the clock signal indicated the state S0, the dedicated processor sends the set point to an AFT S0. In some embodiments, an AFT is a controller.

During the state S1 of the clock signal, the power controller PWR S1 generates a drive power value, which is identified from or the same as the power set point for the state S1 of an RF signal, and provides the drive power value to an RF power supply of the RFG 22 such that the RFG 22 generates the RF signal having the drive power value. Similarly, during the state S0 of the clock signal, the power controller PWR S0 generates a drive power value, which is identified from or the same as the power set point for the state S0 of an RF signal, and provides the drive power value to the RF power supply of the RFG 22 such that the RFG 22 generates the RF signal having the drive power value.

Moreover, during the state S1 of the clock signal, the AFT S1 generates a drive frequency value, which is identified from or the same as the frequency set point for the state S1 of an RF signal, and provides the drive frequency value to the RF power supply of the RFG 22 such that the RFG 22 generates the RF signal having the drive frequency value. Similarly, during the state S0 of the clock signal, the AFT S0 generates a drive frequency value, which is identified from or the same as the frequency set point for the state S0 of an RF signal, and provides the drive frequency value to the RF power supply of the RFG 22 such that the RFG 22 generates the RF signal having the drive frequency value.

In some embodiments, a set point includes a value of power or frequency and a state of an RF signal during which the value is to be achieved.

A sensor, e.g., a complex voltage and current sensor, a power sensor, an impedance sensor, etc., measures one or more parameters at an output of the RFG 22. The RF signal generated by the RFG 22 is sent via the output to the IMC 14. The measured one or more parameters are provided to the dedicated processor and the dedicated processor generates the information associated with one or more parameters from the one or more measured parameters. In some embodiments, the information associated with one or more parameters is the measured one or more parameters. The dedicated processor sends the information associated with one or more parameters to the dedicated transmitter Tx of the physical layer 21 of the RFG 22.

The dedicated transmitter Tx of the physical layer 21 of the RFG 22 applies the communication protocol to the information associated with one or more parameters to generate one or more transfer units and sends, during the clock cycle CB or the clock CA or another clock cycle, the one or more transfer units via the dedicated communication link 32 to the dedicated receiver Rx of the physical layer 23 of the controller 20. The dedicated receiver of the physical layer 23 of the controller 20 applies the communication protocol to extract the information associated with one or more parameters and provides the information associated with one or more parameters to the processor of the controller 20.

The processor of the controller 20 determines from the information associated with one or more parameters whether one or more set points of one or more parameters are to be changed and if so, generates the changed set points. The changed set points are provided by the processor to the dedicated transmitter of the physical layer 23 of the controller 20. The dedicated transmitter of the physical layer 23 of the controller 20 applies the communication protocol to the one or more set points to generate one or more transfer units and sends, during the clock cycle CC, the clock cycle CB, the clock cycle CA, or another clock cycle, the one or more transfer units via the dedicated communication link 30 to the dedicated receiver of the RFG 22 for changing one or more parameters of an RF signal generated by the RFG 22.

Figure 2A:
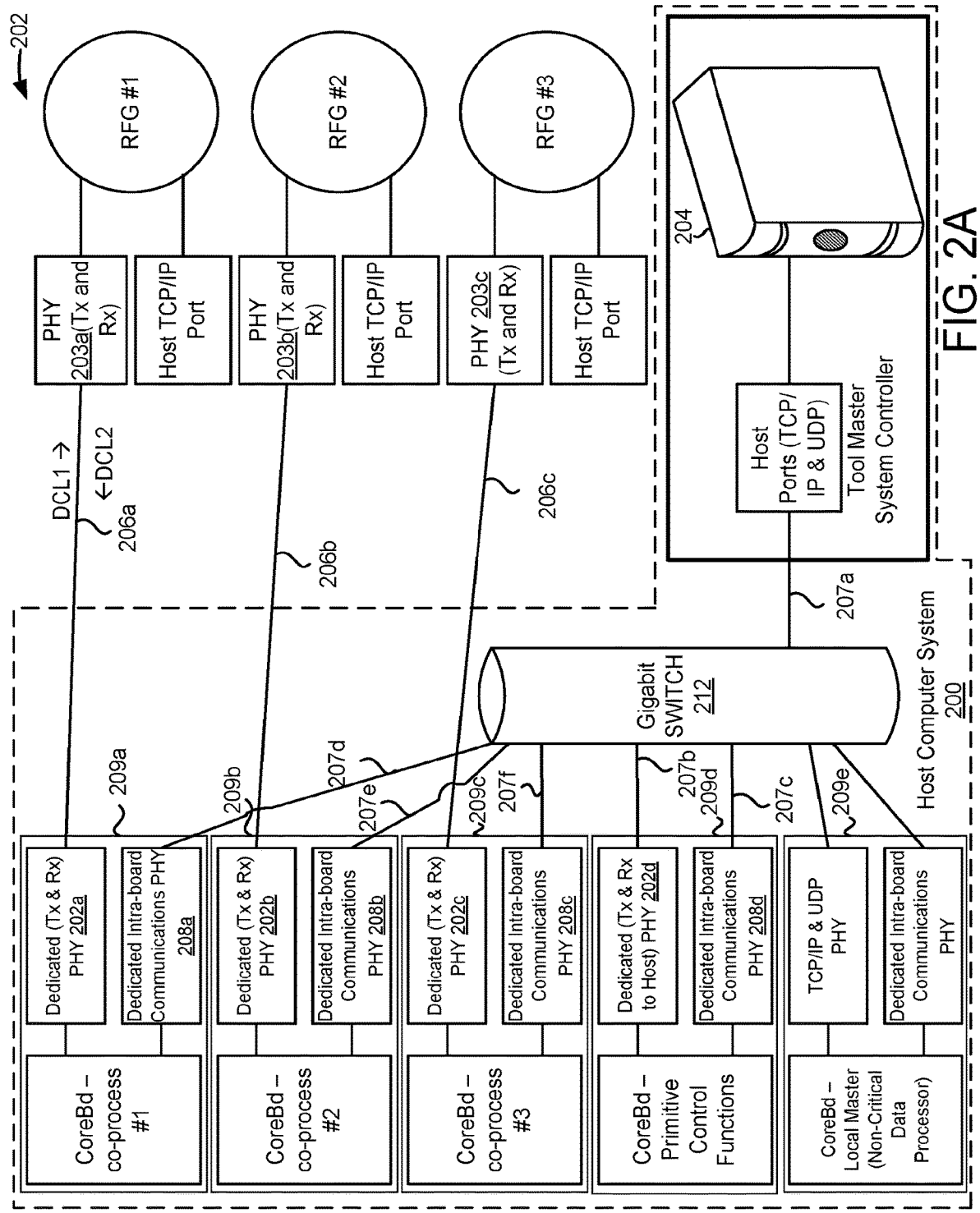
FIG. 2A is a diagram of a system to illustrate use of a communication protocol between a number of local controllers, a number of RF generators, and a master system controller, in accordance with an embodiment described in the present disclosure.

FIG. 2A is a diagram of an embodiment of a system 202 to illustrate use of the communication protocol between a number of local controllers, a number of RF generators, and a master system controller 204. The system 202 includes a host computer system 200, which further includes the local controllers, e.g., co-controller 1, co-controller 2, co-controller 3, primitive control function co-controller, and a non-critical data controller, etc. The host computer system 200 is an example of the controller 20 (FIG. 1A). It should be noted that the co-controller 1 is shown as "CoreBd-coprocess #1" in FIG. 2A. Moreover, the co-controller 2 is shown as "CoreBd-coprocess #2" in FIG. 2A and the co-controller 3 is shown as "CoreBd-coprocess #3" in FIG. 2A. Also, the primitive control function co-controller is shown as "CoreBd-Primitive Control Functions" in FIG. 2A and the non-critical data controller is shown as "CoreBd-Local Master (Non-Critical Data Processor)". The host computer system 200 further includes the master system controller 204 and a switch 212.

A processor of the master system controller 204 generates a command to send to one of the local controllers. For example, the processor of the master system controller 204 generates the command that includes one or more set points, e.g., values, etc., of one or more parameters for the RFG 1. A transmitter of a physical layer connected to the master system controller 204 generates one or more transfer units from the command generated by the processor of the master system controller 204 by applying the communication protocol and sends the one or more transfer units to the switch 212 via a communication link of a physical communication medium 207a that connects the physical layer associated with the master system controller 204 to the switch 212. The physical layer associated with the master system controller 204 is one connected to the master system controller 204.

The switch 212 transfers the one or more transfer units to a dedicated receiver of a dedicated physical layer 202d of the primitive control function co-controller via a dedicated communication link of a physical communication medium 207b that connects the switch 212 to the dedicated receiver. For example, the switch 212 recognizes an identity of a destination port of the primitive control function co-controller included within a transfer unit and transfers the transfer unit to the destination port.

The dedicated receiver of the dedicated physical layer 202d connected to the primitive control function co-controller receives the one or more transfer units from the master system controller 204 and applies the communication protocol to the one or more transfer units to extract the command from the one or more transfer units. The dedicated receiver of the dedicated physical layer 202d of the primitive control function co-controller also determines that the command is designated to be sent to the RFG 1. The command and the determination that the command is designated to be sent to the RFG 1 are provided to a processor of the primitive control function co-controller from the dedicated receiver of the dedicated physical layer 202d. The processor of the primitive control function co-controller provides the command and the determination that the command is designated to be sent to the RFG 1 to a dedicated intra-board physical layer 208d connected to the primitive control function co-controller. The dedicated intra-board physical layer 208d of the primitive control function co-controller sends the command via a dedicated communication link of a physical communication medium 207c to the switch 212, which transfers the command via a dedicated communication link of a physical communication medium 207d to a dedicated intraboard physical layer 208a connected to the co-controller 1. The dedicated intraboard physical layer 208a sends the command to a processor of the co-controller 1. The processor of the co-controller 1 determines from the command and the determination that the command is designated to be sent to the RFG 1 that one or more parameters, e.g., set-points of parameters, parameter values, etc., are to be sent to the RFG 1, and provides a control signal including the one or more parameters to a dedicated transmitter of a dedicated physical layer 202a connected to the co-controller 1.

The dedicated transmitter of the dedicated physical layer 202a of the co-controller 1 applies the communication protocol to the one or more parameters to generate one or more transfer units and sends during the clock cycle CA the one or more transfer units via a dedicated communication link DCL 1 of a physical communication medium 206a to a dedicated receiver of a physical layer 203a of the RFG 1. The dedicated receiver of the physical layer 203a applies the communication protocol to the one or more transfer units to extract the one or more parameters from the one or more transfer units and provides the one or more parameters to a dedicated processor of the RFG 1. The dedicated processor of the RFG 1 controls an RF power supply of the RFG 1 to generate an RF signal having one or more set points, e.g., one or more values, etc., of the one or more parameters received from the co-controller 1.

The dedicated processor of the RFG 1 generates the information associated with one or more parameters and provides the information to a dedicated transmitter of the physical layer 203a of the RFG 1. The dedicated transmitter of the physical layer 203a of the RFG 1 applies the communication protocol to the information associated with one or more parameters to generate one or more transfer units and communicates during the clock cycle CB or the clock cycle CA or another clock cycle the one or more transfer units via a dedicated communication link DCL 2 of the physical communication medium 206a to a dedicated receiver of the dedicated physical layer 202a connected to the co-controller 1.

The dedicated receiver of the dedicated physical layer 202a applies the communication protocol to extract the information associated with one or more parameters from the one or more transfer units and provides the information to the processor of the co-controller 1. The processor of the co-controller 1 provides the information associated with one or more parameters to the dedicated intraboard physical layer 208a connected to the co-controller 1. The dedicated intraboard physical layer 208a sends the information associated with one or more parameters via a dedicated communication link of the physical communication medium 207d to the switch 212. The switch 212 transfers the information associated with one or more parameters via a dedicated communication link of the physical communication medium 207c to the dedicated intraboard physical layer 208d connected to the primitive control function co-controller. The dedicated intraboard physical layer 208d provides the information associated with one or more parameters to the processor of the primitive control function controller. The processor of the primitive control function controller sends the information associated with one or more parameters to a dedicated transmitter of the dedicated physical layer 202d connected to the primitive control function controller. The dedicated transmitter of the dedicated physical layer 202d connected to the primitive control function controller applies the communication protocol to the information associated with one or more parameters to generate one or more transfer units and sends the one or more transfer units via a dedicated communication link of the physical communication medium 207b to the switch 212. The switch 212 determines from the one or more transfer units that the one or more transfer units are designated to be sent to the master system controller 204, and sends the one or more transfer units via the physical communication medium 207a to a receiver of the physical layer associated with the master system controller 204. The switch 212 transfers the one or more transfer units via a communication link of the physical communication medium 207a to a receiver of the physical layer associated with the master system controller 204.

The receiver of the physical layer associated with the master system controller 204 applies the communication protocol to extract the information associated with one or more parameters and provides the information to the processor of the master system controller 204. The processor of the master system controller 204 determines from the information associated with one or more parameters whether to change a value of the one or more parameters for the same state for which the one or more parameters were sent previously during the clock cycle CA to the RFG 1 by the co-controller 1. Upon determining to change one or more values of one or more parameters, the changed one or more values are sent to via the co-controller 1 to the RFG 1 in a manner similar to that described above. On the other hand, upon determining not to change the values of the one or more parameters, the unchanged values are sent to via the co-controller 1 to the RFG 1 in a manner similar to that described above. The co-controller 1 sends the changed or unchanged values during the clock cycle CA or any other clock cycle after the clock cycle CA.

In some embodiments, the master system controller 204 communicates with an RFG using transfer control protocol (TCP) or TCP over IP.

In several embodiments, a command is designated by the master system controller 204 to be sent to the RFG 2 or the RFG 3 instead of the RFG 1. The command when designated to be sent to the RFG 2 is sent in a similar manner as that described above as being sent to the RFG 1 except that the command is sent via the physical communication medium 207a, the switch 212, a dedicated communication link of a physical communication medium 207e, a dedicated intraboard physical layer 208b connected to the co-controller 2, a dedicated communication link of a physical communication medium 206b, and a dedicated receiver of a physical layer 203b of the RFG 2 to a dedicated processor of the RFG 2. Moreover, a command when designated to be sent to the RFG 3 is sent in a similar manner as that described above as being sent to the RFG 1 except that the command is sent via the physical communication medium 207a, the switch 212, a dedicated communication link of a physical communication medium 207f, a dedicated intraboard physical layer 208c connected to the co-controller 3, a dedicated communication link of a physical communication medium 206c, and a dedicated receiver of a physical layer 203c of the RFG 3 to a dedicated processor of the RFG 3.

In some embodiments, commands are sent from the master system controller 204 to all the RFGs 1, 2, and 3, either simultaneously or sequentially.

In various embodiments, the information associated with one or more parameters is generated by the RFG 2, and sent from a dedicated transmitter of the physical layer 203b via a dedicated communication link of the physical communication medium 206b, a dedicated receiver of the physical layer 208b, the dedicated intraboard physical layer 202b connected to the co-controller 2, a dedicated communication link of the physical communication medium 207e, the switch 212, and the communication link of the physical communication medium 207a to the master system controller 204. Moreover, the information associated with one or more parameters is generated by the RFG 3, and sent from a dedicated transmitter of the physical layer 203c via a dedicated communication link of the physical communication medium 206c, a dedicated receiver of the physical layer 202c, the dedicated intraboard physical layer 208c connected to the co-controller 3, a dedicated communication link of the physical communication medium 207f, the switch 212, and the communication link of the physical communication medium 207a to the master system controller 204.

In some embodiments, the co-controller 1, the dedicated physical layer 202a, and the dedicated intraboard physical layer 208a are located on a board 209a. Moreover, the co-controller 2, the dedicated physical layer 202b, and the dedicated intraboard physical layer 208b are located on a board 209b. Also, the co-controller 3, the dedicated physical layer 202c, and the dedicated intraboard physical layer 208c are located on a board 209c. The primitive control function co-controller, the dedicated physical layer 202d and the dedicated intraboard physical layer 208d are located on a board 209d. The non-critical data controller, a physical layer connected to the non-critical data controller, and a dedicated intraboard physical layer connected to the non-critical data controller are located on a board 209e. In some embodiments, a board is a printed circuit board.

In various embodiments, a number of boards used within the system 202 changes with a number of RF generators used. For example, if the system 202 includes the RFG1 and RFG2, the boards 209a and 209b are used and the board 209c is not used.

In some embodiments, the system 202 excludes the board 209e and components, e.g., the non-critical data controller, the physical layer connected to the non-critical data controller, and the dedicated intraboard physical layer connected to the non-critical data controller, etc.

In various embodiments, each of RFG 1, RFG 2, RFG 3, and the master system controller 204 includes TCP/IP ports and communicate with each other via the TCP/IP ports.

In some embodiments, the master system controller 204 configures via the physical layer connected to the master system controller 204 or via a TCP/IP port connected to the master system controller 204, one or more of the RFGs. For example, the master system controller 204 sends a command to the RFG 1 via the TCP/IP port connected to the master system controller 204 and a TCP/IP port connected to the RFG 1, and the command indicates to the physical layer 203*a* of the RFG 1 that the information associated with one or more parameters is to be sent to the co-controller 1. Moreover, the master system controller 204 sends a command to the RFG 2 via the TCP/IP port connected to the master system controller 204 and a TCP/IP port connected to the RFG 2, and the command indicates to the physical layer 203*b* of the RFG 2 that the information associated with one or more parameters is to be sent to the co-controller 2. The master system controller 204 sends a command to the RFG 3 via the TCP/IP port connected to the master system controller 204 and a TCP/IP port connected to the RFG 3, and the command indicates to the physical layer 203*c* of the RFG 3 that the information associated with one or more parameters is to be sent to the co-controller 3. As another example, each RFG is configured via the physical layer connected to the master system controller 204 and a shared physical layer connected to the RFG.

In some embodiments, a dedicated transmitter of a physical layer associated with, e.g., connected to, etc., a co-controller cannot transmit one or more transfer units to more than one RFG. Similarly, in various embodiments, a dedicated transmitter of a physical layer of an RFG cannot transmit one or more transfer units to more than one co-controller. Moreover, in some embodiments, a dedicated receiver of a physical layer associated with a co-controller cannot receive one or more transfer units from more than one RFG. In several embodiments, a dedicated receiver of a physical layer of an RFG cannot receive one or more transfer units from more than one co-controller.

In various embodiments, there is a dual push between a dedicated physical layer associated with a co-controller and a dedicated physical layer associated with an RFG, e.g., a physical layer connected to a dedicated processor of the RFG. For example, there is no request generated by the co-controller for sending to the dedicated processor of the RFG for providing the information associated with one or more parameters. Once the RFG is configured to transfer the information associated with one or more parameters by the master system controller 204 or by the co-controller, the dedicated physical layer associated with the RFG continuously sends, e.g., without being requested, etc., one or more transfer units having the information associated with one or more parameters to the dedicated physical layer associated with the co-controller. The dedicated physical layer associated with the RFG continuously sends one or more transfer units having the information until the master system controller 204 or the co-controller sends a command to the RFG to stop sending the information associated with one or more parameters. Moreover, there is no request generated by the dedicated processor of the RFG for requesting the co-controller to send one or more set points of one or more parameters. The co-controller is programmed to receive the information associated with one or more parameters from the RFG and analyze the information to determine whether to modify one or more set points of one or more parameters for sending to the RFG.

Figure 2B:
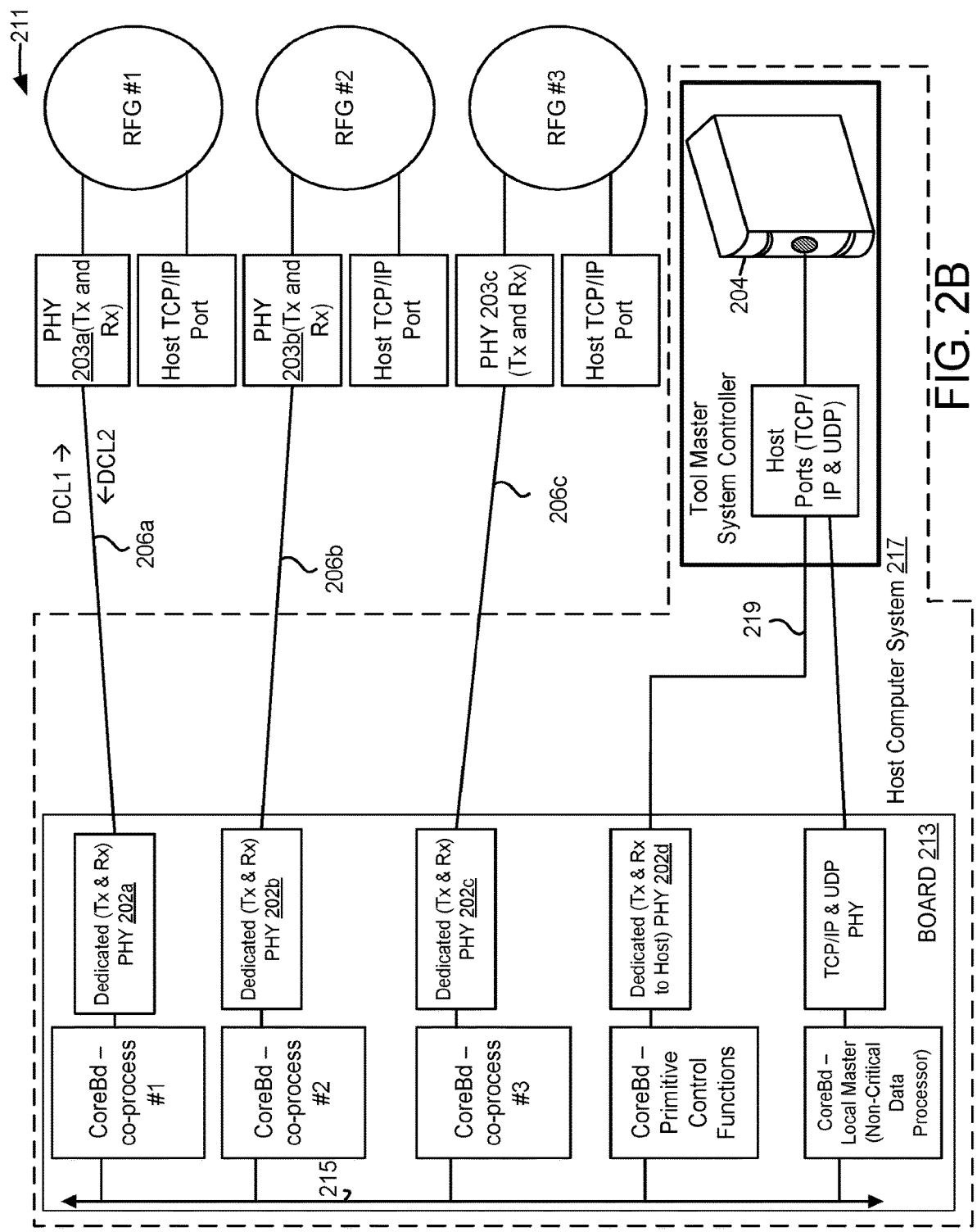
FIG. 2B is a diagram of a system to illustrate a number of local controllers that are placed on one board, in accordance with an embodiment described in the present disclosure.

FIG. 2B is a diagram of an embodiment of a system 211 to illustrate that multiple co-controllers are located on the same board 213, e.g. a printed circuit board, etc., instead of on separate boards. In the system 211, there is no use of dedicated intraboard physical layers, e.g., intraboard receivers and intraboard transmitters, etc. The system 211 is similar to the system 202 (FIG. 2A) except that the system 211 includes a host computer system 217, which is an example of the controller 20 (FIG. 1A). The host computer system 217 does not have the dedicated intraboard physical layers. Moreover, the system 211 does not have the switch 212. In the system 211, the physical layer that is connected to the master controller 204 is used to send the command or receive the information associated with one or more parameters. Moreover, the master controller 204 is connected to the dedicated physical layer 202*d* via a physical communication medium 219. Instead of communicating with the master system controller 204 via the physical communication medium 207*a* (FIG. 2A), the switch 212, and the dedicated physical communication medium 207*b* (FIG. 2A), the dedicated physical communication medium 219 is used to communicate one or more transfer units between the dedicated physical layer 202*d* and the physical layer connected to the master system controller 204. Also, the system 211 has a parallel bus 215 that interconnects the co-controller 1, the co-controller 2, the co-controller 3, the primitive control function co-controller, and the non-critical data controller. Instead of communicating between the co-controllers via the dedicated intraboard physical layers and the switch 212, the co-controllers of the host computer system 217 communicate with each other via the bus 215.

In some embodiments, the bus 215 is dedicated and customized to communicate between the co-controller 1, the co-controller 2, the co-controller 3, the primitive control function co-controller, and the non-critical data controller. For example, the bus 215 facilitates communication between any two of the co-controller 1, the co-controller 2, the co-controller 3, the primitive control function co-controller, and the non-critical data controller in an order of nanoseconds. Each of the co-controller 1, the co-controller 2, the co-controller 3, the primitive control function co-controller, and the non-critical data controller is connected to a general purpose input/output (GPIO) controller, which further connects to the bus 215 via multiple GPIO pins. The GPIO controller performs various functions, e.g., controlling a rate of communication among the co-controller 1, the co-controller 2, the co-controller 3, the primitive control function co-controller, and the non-critical data controller based on a bandwidth of the bus 215, negotiating rates of communication between the co-controller 1, the co-controller 2, the co-controller 3, the primitive control function co-controller, and the non-critical data controller, etc.

In some embodiments, each co-controller and a dedicated physical layer connected to the co-controller are on a separate board. For example, the co-controller 1 and the dedicated physical layer 202*a* are located on a first printed circuit board, the co-controller 2 and the dedicated physical layer 202*b* are located on a second printed circuit board, and the co-controller 3 and the dedicated physical layer 202*c* are located on a third printed circuit board. Each board is connected to the bus 215 via a corresponding GPIO controller and corresponding GPIO pins. Such arrangement of the boards provides modularity and facilitates connection and removal of the boards.

In various embodiments, the dedicated physical layer 203*a* is located within the RFG 1, the dedicated physical layer 203*b* is located within the RFG 2, and the dedicated physical layer 203*c* is located within the RFG 3.

Figure 2C:
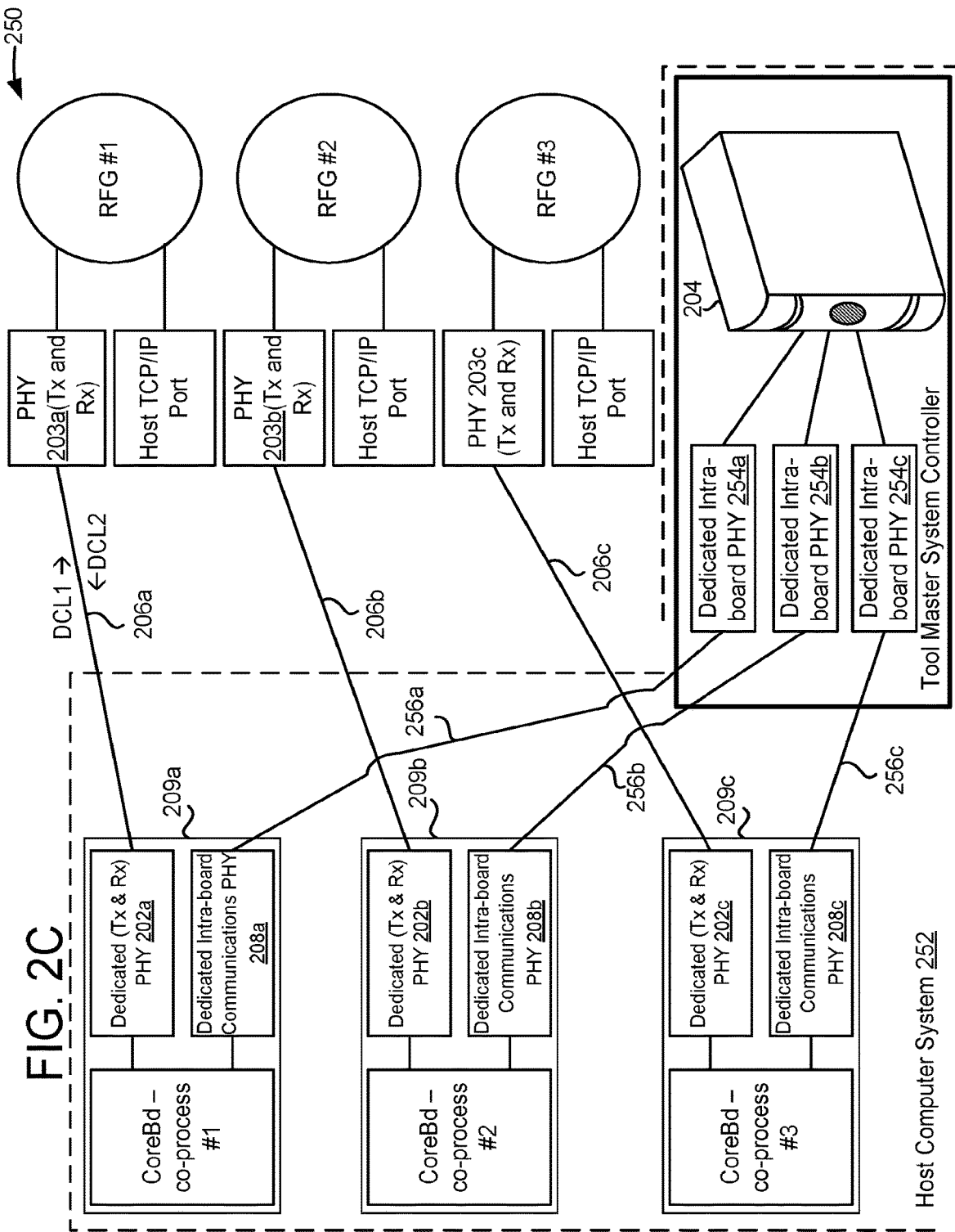
FIG. 2C is a diagram of a system to illustrate communication between the local controllers and the master system controllers without use of a switch between the local controllers and the master system controllers, in accordance with an embodiment described in the present disclosure.

FIG. 2C is a diagram of an embodiment of a system 250 to illustrate point-to-point communication between dedicated intraboard physical layers 254a, 254b, and 254c and the co-controllers 1, 2, and 3. The system 250 is similar to the system 202 (FIG. 2A) except the system 250 excludes the boards 209d and 209e (FIG. 2A) and the switch 212 (FIG. 2A). In the system 250, each of the dedicated intraboard physical layer 254a, 254b, and 254c is connected to the master system controller 204. Moreover, the dedicated intraboard physical layer 254a is connected to the dedicated intraboard physical layer 208a via a dedicated physical communication medium 256a, the dedicated intraboard physical layer 254b is connected to the dedicated intraboard physical layer 208b via a dedicated physical communication medium 256b, and the dedicated intraboard physical layer 254c is connected to the dedicated intraboard physical layer 208c via a dedicated physical communication medium 256c. The boards 209a, 209b, and 209c are located within a host computer system 252, which is an example of the controller 20 (FIG. 1A).

Also, in the system 250, a command is sent from the dedicated intraboard physical layer 254a connected to the master system controller 204 via the dedicated physical communication medium 256a to the dedicated intraboard physical layer 208a, or a command is sent from the dedicated intraboard physical layer 254b connected to the master system controller 204 via the dedicated communication medium 256b to the dedicated intraboard physical layer 208b, and/or a command is sent from the dedicated intraboard physical layer 254c connected to the master system controller 204 via the dedicated physical communication medium 256c to the dedicated intraboard physical layer 208c. Similarly, in the system 250 the information associated with one or more parameters when received from the RFG 1 is sent from the dedicated intraboard physical layer 208a connected to the co-controller 1 via the dedicated physical communication medium 256a to the dedicated intraboard physical layer 254a connected to the master system controller 204. Moreover, the information associated with one or more parameters when received from the RFG 2 is sent from the dedicated intraboard physical layer 208b connected to the co-controller 2 via the dedicated physical communication medium 256b to the dedicated intraboard physical layer 254b connected to the master system controller 204. Also, the information associated with one or more parameters when received from the RFG 3 is sent from the dedicated intraboard physical layer 208c connected to the co-controller 3 via the dedicated physical communication medium 256c to the dedicated intraboard physical layer 254c connected to the master system controller 204.

In some embodiments, the operations described herein as being performed by the master system controller 204 are performed by the co-controller 1, the co-controller 2, or the co-controller 3. For example, instead of the master system controller determining whether to trigger an alarm based on the information associated with one or more parameters received from the RFG 1, the co-controller makes the determination. As another example, instead of the master system controller 204 applying a computer-generated model to determine a set point of a parameter to be provided to the RFG 1, the co-controller 1 makes the determination. The computer-generated model is further described below.

Figure 3:
FIG. 3 is a diagram to illustrate a universal datagram protocol (UDP) transfer unit or a customized transfer unit, in accordance with an embodiment described in the present disclosure.

FIG. 3 is a diagram of an embodiment to illustrate a transfer unit 300, e.g., a datagram, a packet, etc. The transfer unit includes a header field and a payload field, e.g., a field that includes the information associated with one or more parameters for one or more states of an RF signal, a field that includes a set point of a parameter for the one or more states, a field that includes a type of a parameter, etc. Examples of a type of parameter include power, frequency, pulse width of an RF signal, etc. The header field includes a field for an identity of a source port from which the transfer unit is sent, a field for an identity of a destination port designated to receive the transfer unit, a field for a combined length of the header and of a payload attached to the header, and a field for a checksum value.

In various embodiments, the transfer unit 300 is customized, e.g., generated using the customized protocol, etc., to exclude the source port field for identifying the source port and the destination port field for identifying the destination port. In a point-to-point communication, there is no need for identifying the source port and the destination port. The exclusion increases data rate between the controller 20 and the RFG 22 (FIG. 1A).

In some embodiments, the header is customized, e.g., generated using the customized protocol, etc., to exclude the field for the checksum value and/or the field for the combined length of the header and of the payload. The exclusion increases data rate between the controller 20 and the RFG 22.

In various embodiments, the checksum value is generated by a transmitter, e.g., a source port, etc., sending the transfer unit 300. The checksum value is generated from the payload of the transfer unit 300, or the header of the transfer unit 300, or a combination thereof. The checksum value is compared to another checksum value that is calculated by a receiver, e.g., a destination port, etc., of the transfer unit 300 to determine whether the payload and/or a header of the transfer unit 300 changed during a transfer from the transmitter to the receiver.

In some embodiments, a datagram is embedded within an IP packet, which is further embedded within an Ethernet packet.

In various embodiments, the transfer unit 300 is customized, e.g., generated using the customized protocol, etc., such that the fields are in different positions than that shown in FIG. 3. For example, the field for payload is before the field for the length. As another example, the field for the destination port is before the field for the source port or after the field for the length. The customized protocol is applied by a physical layer that generates one or more of customized transfer units, which are transfer units generated using the customized protocol.

Figure 4:
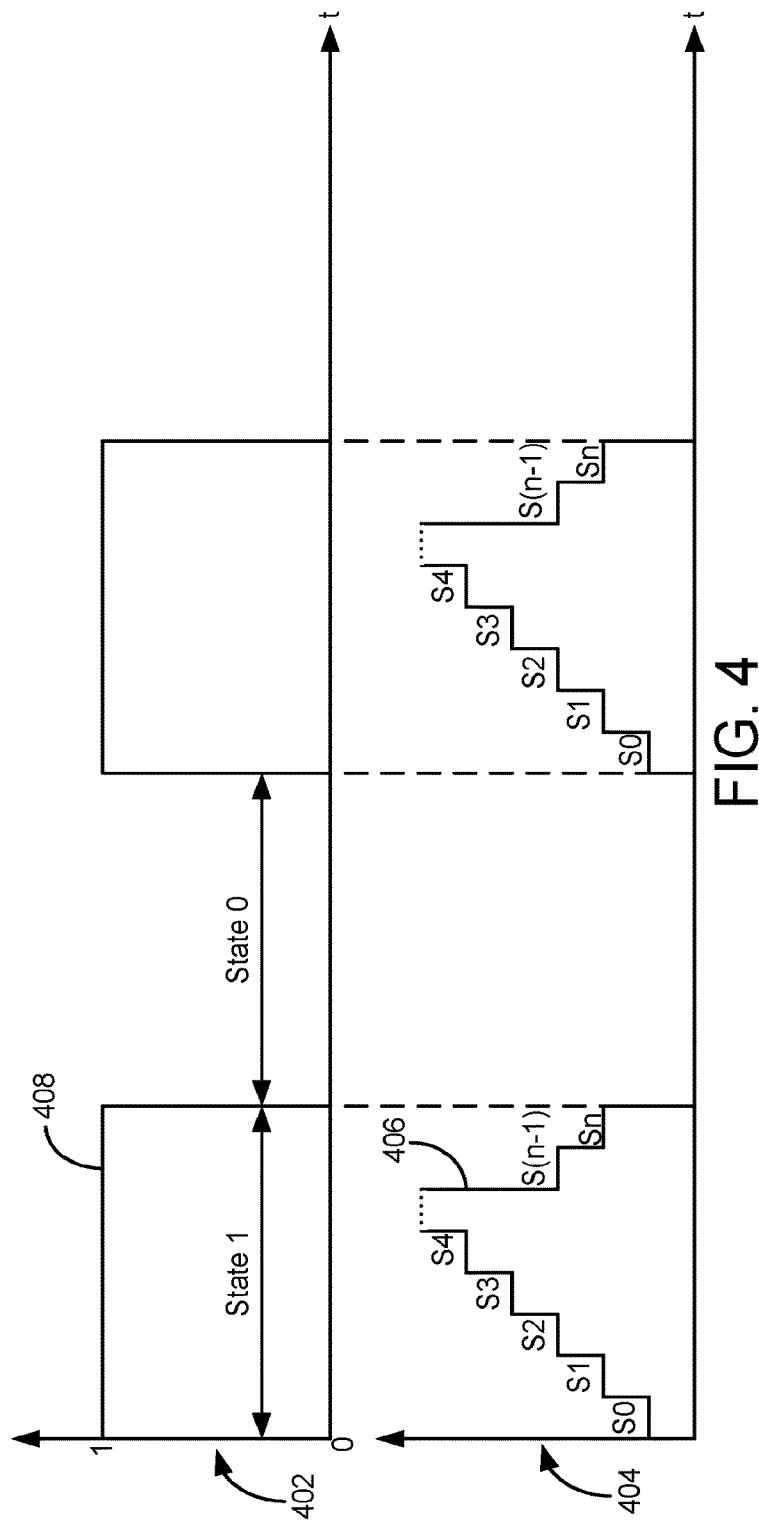
FIG. 4 is a diagram of multiple graphs to illustrate multiple states of an RF signal, in accordance with an embodiment described in the present disclosure.

FIG. 4 is a diagram of multiple graphs 402 and 404 to illustrate multiple states S0 through Sn of an RF signal 406, where n is an integer greater than 0. The RF signal 406 is an example of an RF signal that is generated by an RF generator. The graph 402 plots a clock signal 408, e.g., a transistor-transistor logic (TTL) signal, etc., versus time t. The graph 404 plots the RF signal 406 versus the time t. The RF signal 406 has multiple states S0, S1, S2, S3, S4, and so on until states S(n−1) and Sn when the clock signal 408 is in a state 1, e.g., a high state, a high level, etc. For example, the RF signal 406 has eight states S0 thru S7. As another example, the RF signal 406 has 20 states S0 thru S20. The multiple states S0 thru Sn correspond to a high state of the RF signal 406, e.g., power values of the RF signal 406 in each of the states is higher than power values of the RF signal 406 when the clock signal 408 is in a state 0, e.g., a low state, a low level, etc.

The RF signal 406 is synchronous to the clock signal 408. For example, when the clock signal 408 is in the high state, the RF signal 406 is also in the high state, e.g., RF values of the states S0 thru Sn are greater than RF values of the RF signal 406 when the clock signal is in the state 0, etc. As another example, when the clock signal 408 is in the low state, the RF signal 406 is also in the low state, e.g., RF values of the RF signal 406 when the clock signal is in the state 1 are lower than RF values of the RF signal in the states S0 thru Sn, etc.

In some embodiments, instead of or in addition to the RF signal 406 having multiple states during the high state of the clock signal 408, the RF signal 406 has multiple states during the low state of the clock signal 408. The RF values of the RF signal 406 having the multiple states during the low state of the clock signal 408 are lower than the RF values of the RF signal during the high state of the clock signal 408.

In several embodiments, one or more states similar to the states S1 thru Sn of an RF signal occur when the clock signal 408 is in the state 0. For example, an RF signal has multiple states when the clock signal 408 is in the state 1 and has multiple states when the clock signal 408 is in the state 0.

In some embodiments, one or more states similar to the states S1 thru Sn of an RF signal occur when the clock signal 408 is in the state 0 and the states S1 thru Sn of the RF signal do not occur when the clock signal 408 is in the state 1.

In various embodiments, the RF signal 406 is sinusoidal in form. For example, during each state, the RF signal oscillates to form a sinusoidal signal.

FIG. 5 is a diagram of an embodiment of a system 500 to illustrate a communication of data between a local processor board system 510 and an RFG and between the local processor board system 510 and another local processor board system 514. The local processor board system 510 is an example of the board 209a (FIG. 2A), or the board 209b (FIG. 2A), or the board 209c (FIG. 2A). The local processor board system 514 is an example of the board 209d (FIG. 2A). The RFG is an example of the RFG 1, or the RFG2, or the RFG3.

The RFG is configured to initiate sending the information associated with one or more parameters to the local processor board system 510 via a physical layer 521 of the RFG. The RFG is configured by the processor of the local processor board system 514 via a shared physical layer 513 of the local processor board system 514, a shared communication link of a physical communication medium 527, and the physical layer 521 of the RFG. For example, the shared physical layer 513 applies the communication protocol to configuration information to generate one or more transfer units. The physical layer 521 receives the one or more transfer units having the configuration information from the shared physical layer 513 via the shared communication link of the physical communication medium 527. The physical layer 521 applies the communication protocol to the one or more transfer units having the configuration information to extract the configuration information and provides the configuration information to the dedicated processor of the RFG. The dedicated processor of the RFG determines to initiate sending the information associated with one or more parameters upon reading the configuration information. Upon determining to send the information associated with one or more parameters, the dedicated processor of the RFG sends the information to a dedicated physical layer 523 of the RFG for applying the communication protocol to generate one or more transfer units.

The shared physical layer 513 and the shared communication link of the physical communication medium 527 are shared among the RFG1, the RFG2, and the RFG3. For example, the processor of the local processor board system 514 configures a dedicated physical layer of the RFG 1, a dedicated physical layer of the RFG 2, and a dedicated physical layer of the RFG 3 to initiate sending the information associated with one or more parameters. The configuration is done by sending configuration commands from the shared physical layer 513 via the shared communication link of the physical communication medium 527 to a physical layer of each of the RFG 1, the RFG 2, and the RFG 3. Each of the RFG 1, the RFG 2, and the RFG 3 are connected via its corresponding physical layer to the physical communication medium 527.

Upon being configured by the local processor board system 514, the dedicated physical layer 523 of the RFG generates one or more transfer units by applying the UDP or the customized protocol to the information associated with one or more parameters. A dedicated transmitter of the dedicated physical layer 523 of the RFG pushes, e.g., transfers, etc., via a dedicated communication link 506 of a physical communication medium 507 the one or more transfer units, etc., having the information associated with one or more parameters to a dedicated receiver of a physical layer 502, e.g., a chip, an integrated circuit, etc., of the local processor board system 510. Then, a dedicated transmitter of the physical layer 502 of the local processor board system 510 generates a transfer unit, e.g., the transfer unit 300 (FIG. 3), etc., including one or more set points, e.g., one or more values, etc., for one or more parameters. In some embodiments the set points are received by the local processor board system 510 from the master system controller 204 (FIG. 2A).

The set points are generated based on the information associated with one or more parameters. For example, the information associated with one or more parameters is compared to a pre-determined range to generate the set points. The set points are generated so the information associated with one or more parameters received after the set points are sent to the RFG are within the pre-determined range. An example of a transfer unit that is generated and sent by the dedicated transmitter of the physical layer 502 is provided in FIG. 6. The one or more set points of the one or more parameters are associated with one or more states, e.g., the states S0 and S1, or the state S0, or the state S1, or the states S0 and S1 and S2, or the states S0 thru S2, or the states S0 thru S3, or the states S0 thru S4, or the states S0 thru S5, or the states S0 thru S(n−1), or the states S0 thru Sn, etc., of an RF signal, etc. The dedicated transmitter of the physical layer 502 sends the transfer unit via a dedicated communication link 504 of the physical communication medium 507 to a dedicated receiver of the physical layer 523 of the RFG, e.g., the RFG 1, etc.

The RFG generates an RF signal having the set points received via the dedicated communication link 504. Based on the RF signal, the information associated with one or more parameters is generated by the RFG and packaged within one or more transfer units by the dedicated transmitter of the physical layer 523. Then, the dedicated receiver of the physical layer 502 receives via the dedicated communication link 506 of the physical communication medium 507 one or more transfer units, e.g., the transfer unit 300, etc., including the information associated with one or more parameters from the dedicated transmitter of the physical layer 523 of the RFG. An example of a transfer unit that is received by the dedicated receiver of the physical layer 502 is provided in FIG. 7.

The dedicated receiver of the physical layer 502 applies the communication protocol to extract the information associated with one or more parameters from a transfer unit and provides the information to a processor, e.g., a processor of the co-controller 1, or a processor of the co-controller 2, or a processor of the co-controller 3, etc., of the local processor board system 510. In some embodiments, when the local processor board system 510 has the co-controller 1 integrated therewith, the RFG is the RFG 1 and the physical layer of the RFG is the physical layer 203a (FIG. 2A). Moreover, when the local processor board system 510 has the co-controller 2 integrated therewith, the RFG is the RFG 2 and the physical layer of the RFG is the physical layer 203b (FIG. 2A). Furthermore, when the local processor board system 510 has the co-controller 3 integrated therewith, the RFG is the RFG 3 and the physical layer of the RFG is the physical layer 203c (FIG. 2A).

The processor of the local processor board system 510 determines from the information associated with one or more parameters that one or more set points associated with the one or more states, e.g., the states S0 and S1, or the state S0, or the state S1, or the states S0 and S1 and S2, or the states S0 thru S2, or the states S0 thru S3, or the states S0 thru S4, or the states S0 thru S5, or the states S0 thru S(n−1), or the states S0 thru Sn, etc., of an RF signal is to be modified and modifies the one or more set points to generate one or more modified set points.

The processor of the local processor board system 510 provides the one or more modified set points to the dedicated transmitter of the physical layer 502. The dedicated transmitter of the physical layer 502 applies the communication protocol to the one or more modified set points to generate a transfer unit, e.g., the transfer unit 300, the transfer unit illustrated in FIG. 6, etc., and sends the transfer unit via the dedicated communication link 504 to the dedicated receiver of the physical layer 523 of the RFG. In various embodiments, the one or more modified set points are received by the local processor board system 510 from the master system controller 204.

In some embodiments, there is board-to-board communication between the local processor board system 510 and the local processor board system 514. As an example, the information associated with one or more parameters is transferred from a dedicated transmitter Tx2 of a physical layer 516 that is connected to a co-controller, e.g., the co-controller 1, the co-controller 2, the co-controller 3, etc., of the local processor board system 510 via a first dedicated communication link of a physical communication medium 519 to a dedicated receiver of a physical layer 512 of the local processor board system 514. The dedicated receiver of the physical layer 512 sends the information associated with one or more parameters to a co-controller, e.g., the co-controller 1, the co-controller 2, the co-controller 3, the primitive control function co-controller, etc., that is connected to the physical layers 512 and 513. As another example, one or more set points of one or more parameters are received from the co-controller of the local processor board system 514 by a dedicated transmitter of the physical layer 512 of the local processor board system 514 and sent by the dedicated transmitter via a dedicated communication link of the physical communication medium 519 to a dedicated receiver of the physical layer 516 of the local processor board system 510.

In some embodiments, the local processor board system 514 includes the master system controller 204 (FIG. 2A) instead of the co-controller.

In various embodiments, a rate at which a transfer unit is received by the dedicated receiver of the physical layer 502 of the local processor board system 510 from the dedicated transmitter of the physical layer 523 of the RFG is greater than or equal to a rate at which a transfer unit is sent from the dedicated transmitter of the physical layer 502 to the dedicated receiver of the physical layer 523 of the RFG. Such matched or increased rate of reception facilitates the processor of the local processor board system 510 to determine whether one or more values of one or more parameters for one or more states is to be changed based on the information associated with one or more parameters in a transfer unit received from the dedicated transmitter of the physical layer 523 of the RFG.

In some embodiments, a rate at which a transfer unit is received by the dedicated receiver of the physical layer 502 from the dedicated transmitter of the physical layer 523 of the RFG is less than a rate at which a transfer unit is sent from the dedicated transmitter of the local processor board system 510 to the dedicated receiver of the physical layer 523 of the RFG.

In an embodiment, a dedicated transmitter, e.g., the transmitter of the physical layer 502 of the local processor board system 510, the dedicated transmitter of the physical layer 523 of the RFG, etc., generates a burst transfer unit, e.g., a burst packet, a burst frame, etc., by combining multiple transfer units to generate a series of transfer units. The burst transfer unit reduces overhead for each transfer unit and achieves higher data rates compared to sending transfer units separately. For example, indication of an identity of a source port and a destination port in each transfer unit is not necessary. In this example, a source port and/or a destination port is indicated for multiple transfer units that are combined. As another example, in case of a burst transfer unit, a header for each packet within the burst transfer unit is not needed, e.g., a separation bit indicating a beginning and an end of a packet is not needed, etc. For example, in case of a frame of a burst transfer unit, a header is used before a first packet in the frame, and the remaining packets in the frame do not have a header. The header before the first packet indicated a start of the frame. Such reduction in payload saves time and increases data transfer rate.

Moreover, a time taken by a dedicated transmitter of the local processor board system 510 to generate and combine multiple transfer units allows the processor of the local processor board system 510 or the master system controller 204 to generate a model of a portion of the plasma system 10 (FIG. 1A) and/or to calculate output data at an output of the model. A model of a portion, e.g., the RF cable 16 (FIG. 1A), the IMC 14 (FIG. 1A), the RF transmission line 12 (FIG. 1A), the chuck 18 (FIG. 1A), a combination of the RF cable 16 and the IMC 14, a combination of the RF cable 16 and the IMC 14 and the RF transmission line 12, or a combination of the RF cable 16 and the IMC 14 and the RF transmission line 12 and the chuck 18, etc., of the plasma system 10 is stored a memory device of the local processor board system 510 or in a memory device of the master system controller 204. The model has similar characteristics, e.g., capacitances, inductances, complex power, complex voltage and currents, etc., as that of the portion of the plasma system 10. For example, a model has the same number of capacitors and/or inductors as that within the portion of the plasma system 10, and the capacitors and/or inductors are connected with each other in the same manner, e.g., serial, parallel, etc. as that within the portion of the plasma system 10. To provide an illustration, when the IMC 14 includes a capacitor coupled in series with an inductor, a model of the IMC 14 also includes the capacitor coupled in series with the inductor.

As another example, the portion of the plasma system 10 includes one or more electrical components and the model is a design, e.g., a computer-generated model, etc., of the portion. In some embodiments, the computer-generated model is generated by the processor of the local processor board system 510 or of the master system controller 204 based upon input signals received from a user via an input hardware unit. The input signals include signals regarding which electrical components, e.g., capacitors, inductors, etc., to include in a model and a manner, e.g., series, parallel, etc., of coupling the electrical components with each other. As yet another example, the portion of the plasma system 10 includes hardware electrical components and hardware connections between the electrical components and the model includes software representations of the hardware electrical components and of the hardware connections. As used herein, examples of electrical components include resistors, capacitors, and inductors.

In some embodiments, the processor of the master system controller 204 or of the local processor board system 510 generates output data at an output of a model based on data input to the model and characteristics of components of the model. For example, a directional sum of complex voltages of electrical components of a model and a complex voltage at an input node of the model is calculated by the processor of the master system controller 204 or of the local processor board system 510 to calculate a complex voltage at an output node of the model. The complex voltage at the input node is an example of the information associated with one or more parameters. As another example, a directional sum of complex currents of electrical components of the model and a complex current at an input node of the model is calculated by the processor of the master system controller 204 or of the local processor board system 510 to calculate a complex current at an output node of the model. The complex current at the input node is an example of the information associated with one or more parameters. It should be noted that in some embodiments, the processor of the master system controller 204 or of the local processor board system 510 calculates a complex voltage, a complex current, or a complex voltage and current from the information associated with one or more parameters. Examples of an input at an input node of the model include the information associated with one or more parameters received from the RFG by a dedicated receiver of the physical layer 502. An output at an output node is used by the processor of the master system controller 204 or of the local processor board system 510 to determine whether to change a value of a parameter for one or more states, e.g., any of states S0 thru S7, etc., of an RF signal during a clock cycle, e.g., the clock cycle CC, the clock cycle CA, the clock cycle CB, etc.

In various embodiments, the processor of the master system controller 204 or of the local processor board system 510 decimates data from the information associated with one or more parameters to reduce an amount of the information. For example, the processor of the master system controller 204 or of the local processor board system 510 applies a statistical operation, such as, for example, an insertion sort operation, or a merge sort operation, or a moving interquartile range (IQR) calculation operation, or an interquartile range calculation operation, or a maximum value calculation operation, or a minimum value calculation operation, or a mean value calculation operation, or a median value calculation method, or a variance value calculation method, or a standard deviation value calculation method, or a moving mean value calculation method, or a moving median value calculation method, or a moving variance value calculation method, or a moving standard deviation value calculation method, or a mode, or a moving mode, or a combination thereof, etc., to the information associated with one or more parameters to generate a first statistical value from multiple values of the information associated with one or more parameters. The processor of the master system controller 204 or of the local processor board system 510 compares the first statistical value with a second statistical value generated, by the processor, from one or more set points sent during a previous clock cycle, e.g., the clock cycle CA, etc. Upon determining that the first statistical value is not within a pre-determined range from the second statistical value, the processor of the master system controller 204 or of the local processor board system 510 changes one or more set points of one or more parameters to achieve the first statistical value and sends the one or more changed set points in a manner described above to the RFG. On the other hand, upon determining that the first statistical value is within the pre-determined range from the second statistical value, the processor of the master system controller 204 or of the local processor board system 510 does not change one or more set points of one or more parameters and re-sends the one or more set points to the RFG.

In various embodiments, the first statistical value is used by the processor of the master system controller 204 or of the local processor board system 510 to determine whether to generate alarm data. For example, upon determining that the first statistical value is not within the pre-determined range from the second statistical value, the processor of the master system controller 204 or of the local processor board system 510 generates alarm data. On the other hand, upon determining that the first statistical value is within the pre-determined range from the second statistical value, the processor of the master controller system 204 or of the local processor board system 510 does not generate the alarm data. The alarm data is rendered by the processor of the master system controller 204 or of the local processor board system 510 for display on a display device or by other mechanisms described above.

In some embodiments, a value of a parameter for a first state, e.g., the state S0, etc., of an RF signal is communicated from a controller to an RFG using a different transfer unit than a transfer unit used to communicate a value of the parameter for a second state, e.g., the state S1, etc. In this embodiment, information associated with the parameter for the first state is communicated from the RFG to the controller using a different transfer unit than a transfer unit used to communicate information associated with the parameter for the second state.

In various embodiments, a value of a parameter for a first set of states, e.g., the states S0 and/or S1, etc., of an RF signal is communicated from a controller to an RFG using a different transfer unit than a transfer unit used to communicate a value of the parameter for a second set of states, e.g., the states S2, S3, and/or S4, etc. In this embodiment, information associated with the parameter for the first set of states is communicated from the RFG to the controller using a different transfer unit than a transfer unit used to communicate information associated with the parameter for the second set of states.

In some embodiments, instead of board-to-board communication between the physical layers 512 and 516, communication between the physical layers 512 and 516 occurs via the switch 212 (FIG. 2A).

In several embodiments, the shared physical layer 513 is located on the local processor board system 510 instead of on the local processor board system 514. For example, the co-controller of the local processor board system 510 configures the dedicated physical layer 523 of the RFG via the shared communication link of the physical communication medium 527 and the physical layer 521.

FIG. 6 is an embodiment of a datagram that is sent from a physical layer associated with a co-controller, e.g., the physical layer 202a, or the physical layer 202b, or the physical layer 202c (FIG. 2A), etc., to a physical layer of an RFG, e.g., the physical layer 203a, or the physical layer 203b, or the physical layer 203c (FIG. 2A), etc. The datagram includes power and frequency set points for the states S0 thru Sn of an RF signal. Each set point translates into a number of bytes, e.g., M bytes, where M is an integer. For example, M is 4 or 8 or 16 or 32 or 64, etc. The value of M depends on a speed of processing by a processor, e.g., the co-controller 1, the co-controller 2, the co-controller 3, etc., and/or of the dedicated physical layer coupled to the co-controller.

In various embodiments, in addition to or instead of providing the power and frequency set points, a pulse width is provided as a set point for a state of an RF signal. For example, for eight states of an RF signal, eight different pulse widths of the RF signal are provided as eight set points.

In some embodiments, multiple frequency set points for the states S1 through Sn are calculated by the controller 20 using a computer-generated model of the IMC 14 (FIG. 1A). For a given impedance Zo at an output of the computer-generated model of the IMC and a capacitance value C1 of one or more variable capacitors of the computer-generated model of the IMC, each of the multiple frequency set points is calculated to achieve a minimum value of a parameter, e.g., a reflection coefficient, reflected power, etc., at an input of the computer-generated model of the IMC 14. For example, for the state S1, for the given impedance Zo and the capacitance value C1 of the one or more variable capacitors, a frequency set point f1 at which the RFG 22 is to be operated is calculated to achieve a minimum value Γ1 of a reflection coefficient at the input of the computer-generated model of the IMC 14. As another example, for the state S2, for the given impedance Zo and the capacitance value C1 of the one or more variable capacitors, a frequency set point f2 at which the RFG 22 is to be operated is calculated to achieve a minimum value Γ2 of a reflection coefficient at the input of the computer-generated model of the IMC 14. The impedance at the output of the computer-generated model of the IMC 14 is calculated from an impedance measured, by a sensor, at an output of the RFG 22 (FIG. 1A) and from values of elements of the computer-generated model of the IMC 14. The multiple frequency set points are sent in a block, e.g., a frame, one or more transfer units, etc., from the controller 20 to the RFG 22 via the dedicated communication link 30 (FIG. 1A) so that the RFG 22 operates using the multiple frequency set points at a fast rate to achieve the minimum values of the reflection coefficients. For example, when the RFG 22 is a y megahertz RF generator and another RF generator connected to the IMC 14 is an x1 kilohertz or x2 megahertz RF generator or y MHz RF generator, the RFG 22 cycles through the states S1 thru Sn during a cycle of operation of the x1 kilohertz or the x2 megahertz RF generator or the y megahertz RF generator. Examples of the y megahertz RF generator include a 60 megahertz RF generator or a 27 megahertz RF generator. An example of the x1 kilohertz RF generator includes a 400 kilohertz RF generator. An example of the x2 megahertz RF generator includes a 2 megahertz RF generator. An example of the y megahertz RF generator includes a 27 megahertz RF generator.

FIG. 7 shows an embodiment of the burst transfer unit, e.g., a frame, etc., that include multiple transfer units, e.g., multiple sub-packets, etc., including the information associated with one or more parameters for sending from the RFG 22 (FIG. 1A) to the controller 20 for being monitored by the controller 20 (FIG. 1A). For example, information 1 within a sub-packet 1 is power that is delivered by the RFG 22, information 2 within the sub-packet 1 is a real part of gamma determined from an RF signal that is delivered by the RFG 22 to the IMC 14, information 3 within the sub-packet 1 is an imaginary part of the gamma, information 4 within the sub-packet 1 is an amount of time elapsed since a clock edge of a clock signal occurred, information 5 within the sub-packet 1 is a tune frequency of an RF signal that is supplied by the RFG 22 to the IMC 14, information 6 within the sub-packet 1 is an internal set point of the RFG 22, information 7 within the sub-packet 1 is a time stamp, information 8 within the sub-packet 1 is the status vector, information 9 within the sub-packet 1 is a root mean square voltage at a second harmonic frequency of an RF signal that is delivered by the RFG 22, information 10 within the sub-packet 1 is a root mean square current at the second harmonic frequency, information 11 within the sub-packet 1 is a voltage at a third harmonic frequency of the RF signal, information 12 within the sub-packet 1 is a current at the third harmonic frequency, information 13 within the sub-packet 1 is a voltage at a fourth harmonic frequency of the RF signal, and information 14 within the sub-packet 1 is a current at the fourth harmonic frequency, etc. In this example, the information 1 thru 14 are values of different parameters for the same state of an RF signal. The power that is delivered by the RFG 22 is measured by a power sensor located within the RFG 22 and coupled to an output of the RFG 22 at which an RF signal having the power is delivered to the IMC 14. In some embodiments, the power that is delivered by the RFG 22 is provided as a set point by the controller 20 to the RFG 22. Examples of the internal set point of the RFG 22 include a power set point that is received from the controller 20 or a frequency set point that is received from the controller 20. Examples of the time stamp include a time at which a fault occurred, or a time at which a state of an RF signal changed, etc. In some embodiments, the voltages and currents at the harmonic frequencies are measured by a voltage and current sensor that is connected to the output of the RFG 22.

As another example, the information 1 is a value of a parameter for the state S0, the information 2 is a value of the parameter for the state S1 of an RF signal, the information 3 is a value of the parameter for the state S2 of the RF signal, the information 4 is a value of the parameter for the state S3 of the RF signal, the information 5 is a value of the parameter for the state S4 of the RF signal, the information 6 is a value of the parameter for the state S5 of the RF signal, the information 7 is a value of the parameter for the state S6 of the RF signal, the information 8 is a value of the parameter for the state S7 of the RF signal, the information 9 is a value of the parameter for the state S8 of the RF signal, the information 10 is a value of the parameter for the state S9 of the RF signal, the information 11 is a value of the parameter for the state S10 of the RF signal, the information 12 is a value of the parameter for the state S11 of the RF signal, the information 13 is a value of the parameter for the state S12 of the RF signal, the information 14 is a value of the parameter for the state S13 of the RF signal. In this example, the information pieces 1 thru 14 are values of the same parameter for different states of the RF signal.

The multiple transfer units, e.g., multiple sub-packets etc., are sent in the burst mode in the frame in which the information 1 thru 14 is sent from a physical layer of the RFG 22 to a physical layer of the controller 20. Each of information 1 thru 14 translates into a number of bytes, e.g., M bytes, etc. The value of M depends on a speed of processing by a processor, e.g., a dedicated processor of the RFG 1, a dedicated processor of the RFG 2, a dedicated processor of the RFG 3, etc., and/or of the dedicated physical layer coupled to the dedicated processor.

In various embodiments, the sub-packet includes p pieces of information, e.g., 12 pieces, 13 pieces, etc., where p is an integer greater than zero.

In some embodiments, a burst transfer unit is sent from the controller 20 to the RFG 22 (FIG. 1A). The burst transfer unit sent from the controller 20 to the RFG 22 has a similar format to that of the burst transfer unit illustrated in FIG. 7 in that the burst transfer unit includes multiple packets, e.g., datagrams, etc.

Figure 8:
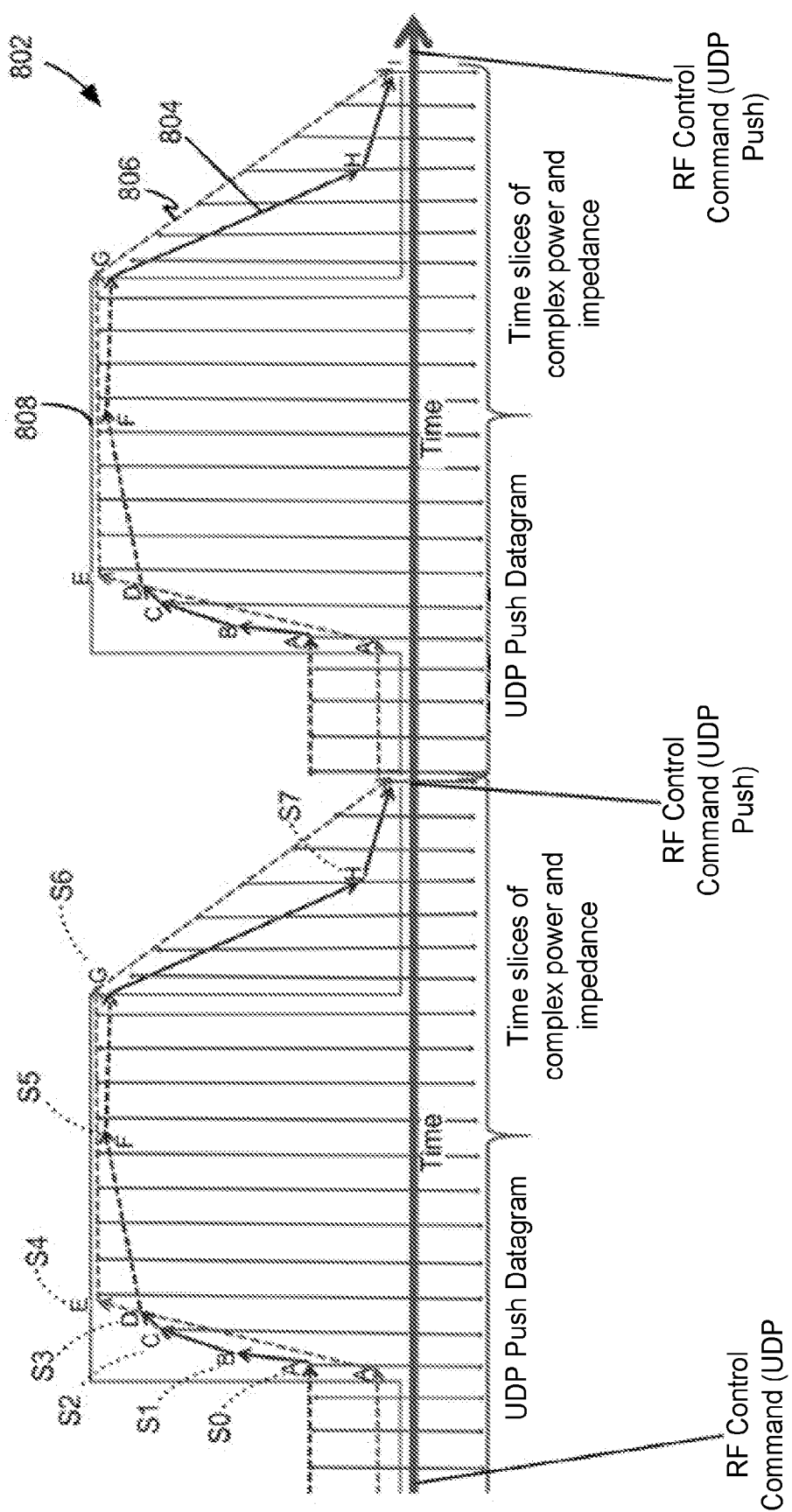
FIG. 8 is a graph to illustrate sampling of set points of one or more parameters to be used in generating an RF signal, in accordance with an embodiment described in the present disclosure.

FIG. 8 is a graph 802 to illustrate a change in a parameter of an RF signal within an RF pulse of the RF signal. The graph 802 includes a plot 806 of values of power of an RF signal to be generated versus time t, a plot 804 of values of frequency of the RF signal versus time, and a plot 808 of a clock signal. The graph 802 shows an example of a transfer unit received by the dedicated physical layer 21 (FIG. 1A) of the RFG 22 from the dedicated physical layer 23 (FIG. 1A) of the controller 20 and sampling of the transfer unit by the dedicated receiver of the dedicated physical layer 21 to extract the one or more parameters. For example, the graph 804 shows an example of a transfer unit received by the dedicated physical layer 203a (FIG. 2A) connected to the RFG 1 from the dedicated physical layer 202a (FIG. 2A) connected to the co-controller 1 of the controller 20. The dedicated transmitter of the physical layer 23 creates a transfer unit that includes values of a parameter for the states S0 thru S7 of an RF signal. It should be noted that a point A shown in the graph 802 corresponds to the state S0 of an RF signal, a point B corresponds to the state S1 of the RF signal, a point C corresponds to the state S2 of the RF signal, a point D corresponds to the state S3 of the RF signal, a point E corresponds to the state S4 of the RF signal, a point F corresponds to the state S5 of the RF signal, a point G corresponds to the state S6 of the RF signal, and a point H corresponds to the state S7 of the RF signal. In some embodiments, any other number of states of an RF signal are used in the graph 802.

Both a power set point for the state S0 of the RF signal and a frequency set point for the state S0 are sampled at the point A by the dedicated receiver of the dedicated physical layer 21 of the RFG 22, a power set point for the state S1 of the RF signal and a frequency set point for the state S1 are sampled at the point B by the dedicated receiver of the dedicated physical layer 21 of the RFG 22, a power set point for the state S2 of the RF signal and a frequency set point for the state S2 are sampled at the point C by the dedicated receiver of the dedicated physical layer 21 of the RFG 22, a power set point for the state S3 of the RF signal and a frequency set point for the state S3 are sampled at the point D by the dedicated receiver of the dedicated physical layer 21 of the RFG 22, a power set point for the state S4 of the RF signal and a frequency set point for the state S4 are sampled at the point E by the dedicated receiver of the dedicated physical layer 21 of the RFG 22, a power set point for the state S5 of the RF signal and a frequency set point for the state S5 are sampled at the point F by the dedicated receiver of the dedicated physical layer 21 of the RFG 22, a power set point for the state S6 of the RF signal and a frequency set point for the state S6 are sampled at the point G by the dedicated receiver of the dedicated physical layer 21 of the RFG 22, and a power set point for the state S7 of the RF signal and a frequency set point for the state S7 are sampled at the point H by the dedicated receiver of the dedicated physical layer 21 of the RFG 22. At an end of a clock cycle of the clock signal, the dedicated transmitter of the dedicated physical layer 23 of the controller pushes the transfer unit to a dedicated receiver of the dedicated physical layer 21 of the RFG 22 via the dedicated communication link 30 (FIG. 1A) of the physical communication medium 31 (FIG. 1A). In some embodiments, a transfer unit is pushed at an end of each clock cycle.

Figure 9:
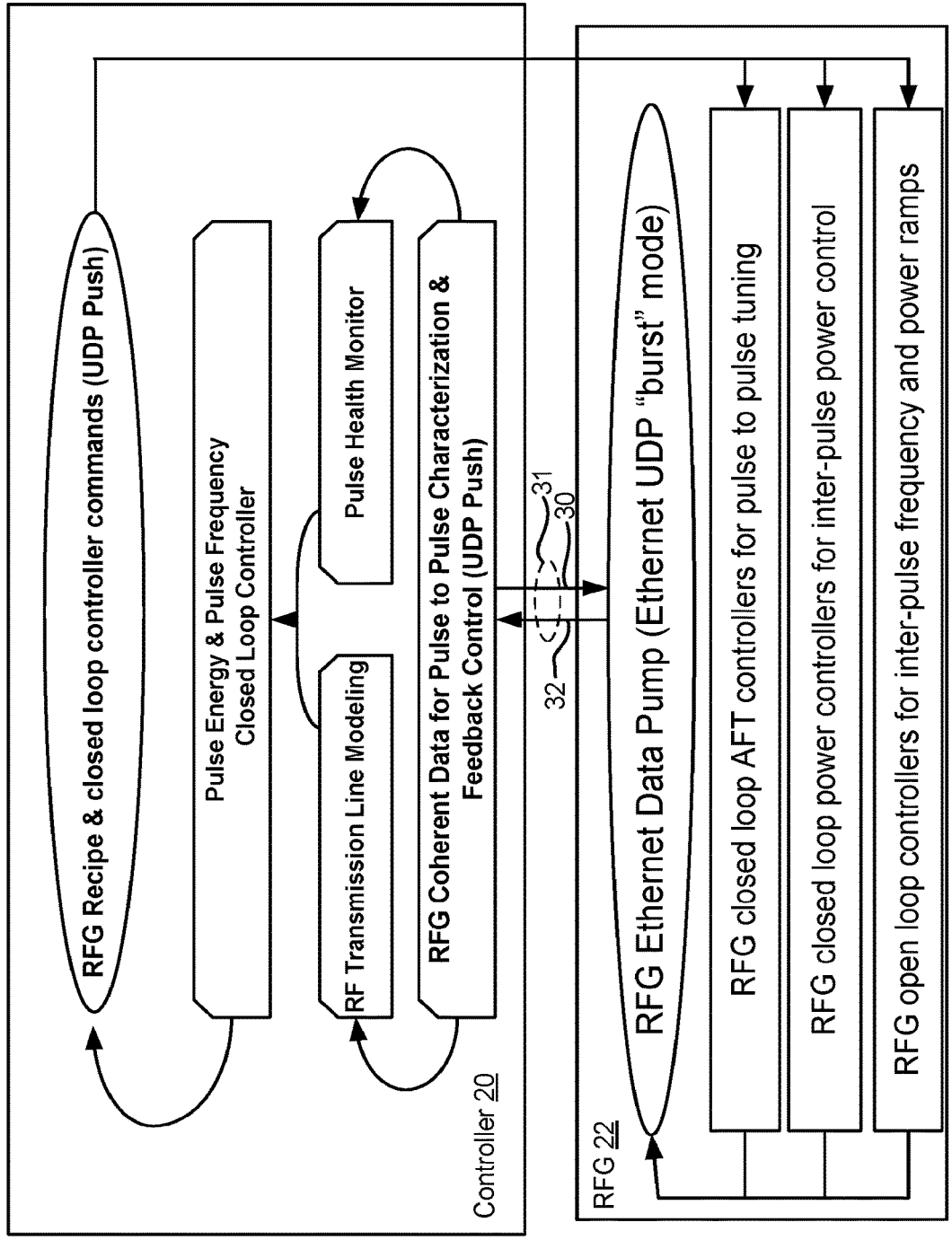
FIG. 9 is a flowchart of a method to illustrate push of transfer units by using a communication protocol between a dedicated transmitter of an RFG and a dedicated receiver of a controller and between a dedicated transmitter of the controller and a dedicated receiver of the RFG, in accordance with an embodiment described in the present disclosure.

FIG. 9 is a flowchart of an embodiment of a method to illustrate a push of one or more transfer units by using the communication protocol between dedicated transmitters of the RFG 22 and the controller 20. As shown in FIG. 9, the RFG 22 includes one or more inter-pulse transition controllers to control frequencies during a transition state between two consecutive states of an RF signal that is generated by the RFG 22. For example, an inter-pulse transition controller provides frequencies of an RF signal to be generated by an RF power supply of the RFG 22 for a time period in which the RF signal transitions from one state to another consecutive state. Moreover, as shown in FIG. 9, the RFG 22 includes one or more inter-pulse transition controllers to control amounts of power during a transition state between two consecutive states of an RF signal that is generated by the RFG 22. For example, an inter-pulse transition controller provides power amounts of an RF signal to be generated by an RF power supply of the RFG 22 for a time period in which the RF signal transitions from one state to another consecutive state. Moreover, the RFG 22 includes one or more AFTs to control frequencies during the states S1 through Sn of an RF signal that is generated by the RFG 22. For example, an AFT provides frequencies of an RF signal to be generated by an RF power supply of the RFG 22 when the RF signal is in the state S0 or the state S1. Also, the RFG 22 includes one or more intra-pulse power controllers to control power amounts during the states S0 through Sn of an RF signal that is generated by the RFG 22. For example, an intra-pulse power controller provides power amounts of an RF signal to be generated by an RF power supply of the RFG 22 for a period of time in which the RF signal is in the state S(n−1) or the state Sn.

During the burst mode, the information associated with one or more parameters, e.g., a frequency of an RF signal during a time the RF signal is transitioning from one state to another consecutive state, a power of the RF signal during a time the RF signal is transitioning between the two consecutive states, a frequency of the RF signal during a time the RF signal is in the state S(n−1) or the state Sn, and a power of the RF signal during a time the RF signal is in the state S(n−1) or the state Sn, etc., is embedded within one or more transfer units by the dedicated transmitter of the RFG 22 and sent from the dedicated transmitter of the physical layer 21 of the RFG 22 via the dedicated communication link 32 to the dedicated receiver of the controller 20, e.g., the dedicated receiver of the physical layer 23 of the controller 20. The dedicated receiver of the physical layer 23 of the controller 20 applies the communication protocol to extract the information associated with one or more parameters, and provides the information to a co-controller, e.g., the co-controller 1, etc., that is associated with the RFG 22. For example, the co-controller 1 is connected to and so associated with the RFG 1. As another example, the co-controller 2 is connected to and so associated with the RFG 2, and the co-controller 3 is connected to and so associated with the RFG 3.

The co-controller provides the information associated with one or more parameters to the master system controller 204 (FIGS. 2A-2C) in a manner described above. The master system controller 204 applies the model of the portion of the plasma system 10 to the information associated with one or more parameters to generate one or more set points for the one or more parameters in a manner described above. In some embodiments, the master system controller 204 determines whether to generate the alarm data based on the information associated with one or more parameters and/or whether to change one or more set points for the one or more parameters based on the information. The dedicated transmitter of the physical layer 23 of the controller 20, e.g., the dedicated transmitter of the physical layer 202a (FIG. 2A) connected to the co-controller 1 of the controller 20, etc., receives one or more set points for one or more parameters from the master system controller 204 in a manner described above, and applies the communication protocol to generate one or more transfer units that include the one or more set points. The one or more transfer units are sent from the dedicated transmitter of the physical layer 23 of the controller 20 via the dedicated communication link 30 of the physical communication medium 31 to the dedicated receiver of the physical layer 21 of the RFG 22, e.g., the dedicated receiver of the physical layer 203a of the RFG 1 connected the co-controller 1, etc.

The dedicated receiver of the physical layer 21 of the RFG 22 receives the one or more transfer units and applies the communication protocol to the one or more transfer units to parse the one or more transfer units and extract one or more set points for one or more parameters for providing to the dedicated processor of the RFG 22. The one or more set points are analyzed by the dedicated processor of the RFG 22 to determine whether the set point is a frequency of an RF signal to be generated during a transition between two consecutive states, or a power of the RF signal to be generated during the transition, or a power of the RF signal to be generated during the state S(n−1) or Sn, or a frequency of the RF signal to be generated during the state S(n−1) or Sn. Based on the determination, the dedicated processor of the RFG 22 provides the frequency set point for the transition to an inter-pulse transition frequency controller of the RFG 22, provides the power set point for the transition to an inter-pulse transition power controller of the RFG 22, provides the frequency set point to be applied during a state to an AFT of the RFG 22, and provides the power set points to be applied during the state to an intra-pulse power controller of the RFG 22. The RF power supply of the RFG 22 receives the frequency set point for the transition from an inter-pulse transition frequency controller of the RFG 22, the power set point for the transition from another inter-pulse transition power controller of the RFG 22, the frequency set point for the state S(n−1) or Sn from an AFT of the RFG 22, and the power set point for the state S(n−1) or Sn from an intra-pulse power controller of the RFG 22 to generate an RF signal having the frequency set point during the transition, the power set point during the transition, the frequency set point for the state S(n−1) or Sn, and the power set point for the state S(n−1) or Sn.

Figure 10A:
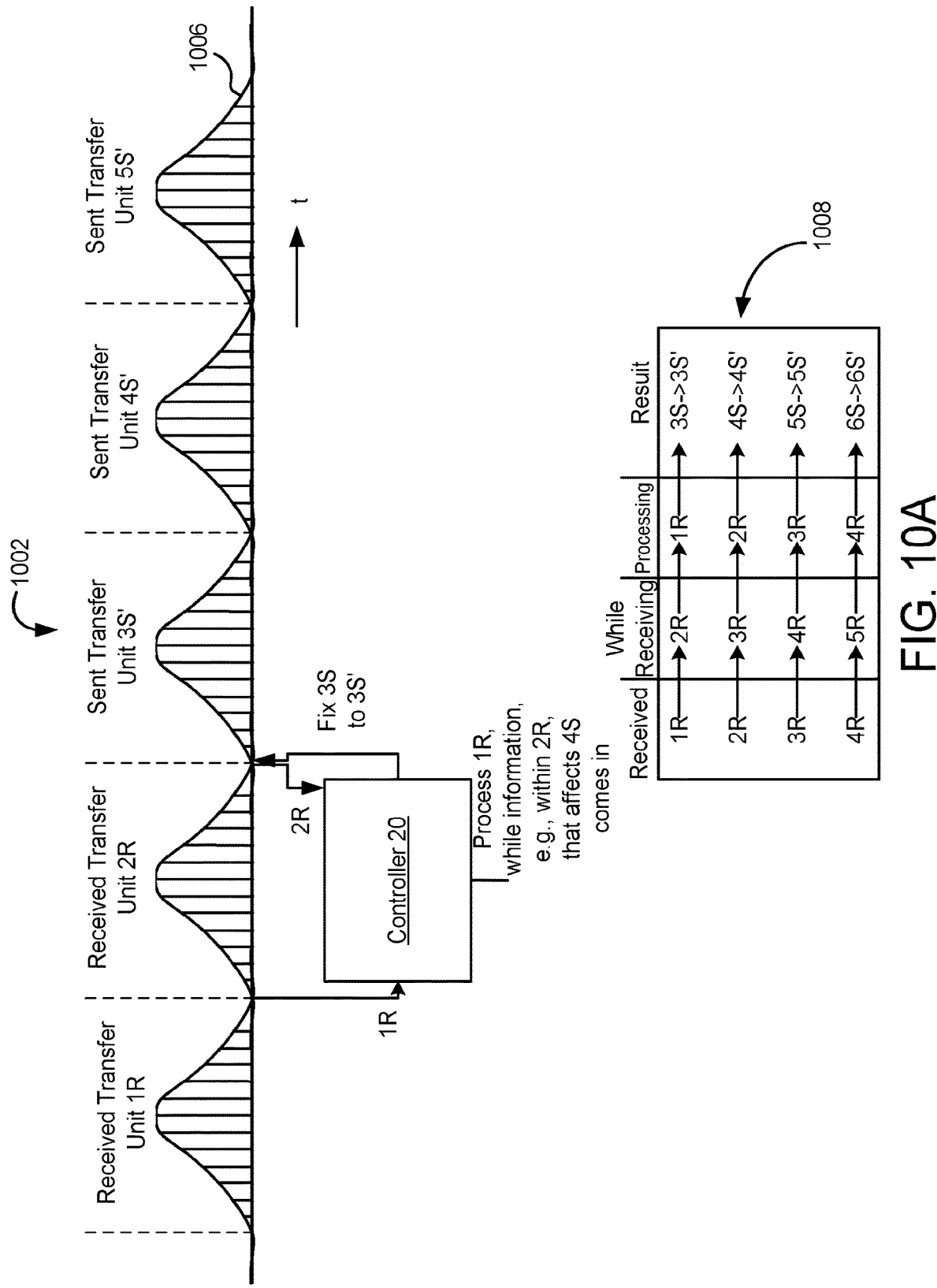
FIG. 10A is a diagram to illustrate a method for changing a value of a parameter for a state by analyzing a value of the parameter for the state while a transfer unit is being received by a receiver, in accordance with an embodiment described in the present disclosure.

FIG. 10A is a diagram to illustrate an embodiment of a method for changing a value of a parameter for a state by analyzing the information associated with one or more parameters for the state. The method is illustrated using a graph 1002 and a table 1008. The graph 1002 includes a plot 1006 of transfer units versus time t, which is measured using a clock signal.

A processor of the controller 20, e.g., a processor of the co-controller 1, a processor of the co-controller 2, a processor of the co-controller 3, a processor of the master system controller 204, etc., processes a value of a parameter that is generated from the information associated with one or more parameters received within a transfer unit 1R by the dedicated receiver of the dedicated physical layer 23 (FIG. 1A) of the controller 20 while the dedicated receiver of the controller 20 receives within a transfer unit 2R the information associated with one or more parameters from the dedicated transmitter of the physical layer 21 of the RFG 22. For example, the co-controller 1 or the master system controller 204 processes a value of a parameter that is generated from the transfer unit 1R received by the dedicated receiver of the physical layer 202a (FIG. 2A) from the dedicated transmitter of the physical layer 203a (FIG. 2A) associated with the RFG 1 via a dedicated communication link of the physical communication medium 206a (FIG. 2A) while the dedicated receiver of the physical layer 202a receives the transfer unit 2R via the dedicated communication link from the dedicated transmitter connected to the RFG 1. The processor of the controller 20 determines based on a value of a parameter that is generated from the information associated with one or more parameters received within the transfer unit 1R that a value of the parameter to be sent to the RFG 22 within a transfer unit 3S is to be changed, e.g., indicated as a change from the transfer unit 3S to a transfer unit 3S' in the table 1008. The changed parameter is embedded within the transfer unit 3S' by the dedicated transmitter of the physical layer 23 of the controller 20 and sent via the dedicated communication link 30 of the physical communication medium 31 to the dedicated receiver of the physical layer 21 of the RFG 22. For example, the changed parameter is embedded within the transfer unit 3S' by the dedicated transmitter of the physical layer 202a connected to the co-controller 1 and sent via the dedicated communication link of the physical communication medium 206a to the dedicated receiver of the physical layer 203a associated with the RFG 1.

Similarly, the processor of the host computer system 200 processes a value of a parameter that is generated from the information associated with one or more parameters received within the transfer unit 2R by the dedicated receiver of the physical layer 23 of the controller 20 while the dedicated receiver of the physical layer 23 receives within a transfer unit 3R the information associated with one or more parameters from the dedicated transmitter of the physical layer 21 of the RFG 22. The processor of the controller 20 determines based on the value of the parameter that is generated from the information associated with one or more parameters received within the transfer unit 2R that a value of a parameter to be sent to the RFG within a transfer unit 4S is to be changed e.g., indicated as a change from 4S to 4S' in the table 1008, etc. The changed parameter is embedded within the transfer unit 4S' by the dedicated transmitter of the physical layer 23 of the controller 20 and sent via the dedicated communication link 30 of the physical communication medium 31 (FIG. 1A) to the dedicated physical layer 21 of the RFG 22.

Moreover, similarly, the processor of the host computer system 200 processes a value of a parameter that is generated from the information associated with one or more parameters received within the transfer unit 3R by the dedicated receiver of the physical layer 23 of the controller 20 while the dedicated receiver of the physical layer 23 receives within a transfer unit 4R the information associated with one or more parameters from the dedicated transmitter of the physical layer 21 of the RFG 22. The processor of the host computer system 200 determines based on the value of the parameter that is generated from the information associated with one or more parameters received within the transfer unit 3R that a value of a parameter to be sent to the RFG within a transfer unit 5S is to be changed e.g., indicated as a change from 5S to 5S' in the table 1008, etc. The changed parameter is embedded within the transfer unit 5S' by the dedicated transmitter of the physical layer 23 of the controller 20 and sent via the dedicated communication link 30 of the physical communication medium 31 to the dedicated physical layer 21 of the RFG 22.

Also, similarly, the processor of the host computer system 200 processes a value of a parameter that is generated from the information associated with one or more parameters received within the transfer unit 4R by the dedicated receiver of the physical layer 23 of the controller 20 while the dedicated receiver of the physical layer 23 receives within a transfer unit 5R the information associated with one or more parameters from the dedicated transmitter of the physical layer 21 of the RFG 22. The processor of the host computer system 200 determines based on the value of the parameter that is generated from the information associated with one or more parameters received within the transfer unit 4R that a value of a parameter to be sent to the RFG within a transfer unit 6S is to be changed e.g., indicated as a change from 6S to 6S' in the table 1008, etc. The changed parameter is embedded within the transfer unit 6S' by the dedicated transmitter of the physical layer 23 of the controller 20 and sent via the dedicated communication link 30 of the physical communication medium 31 to the dedicated physical layer 21 of the RFG 22.

In some embodiments, there is a fixed delay between receiving the transfer unit 1R and sending the transfer unit 3S', between receiving the transfer unit 2R and sending the transfer unit 4S', between receiving the transfer unit 3R and sending the transfer unit 5S', and between receiving the transfer unit 4R and sending the transfer unit 6S'.

Figure 10B:
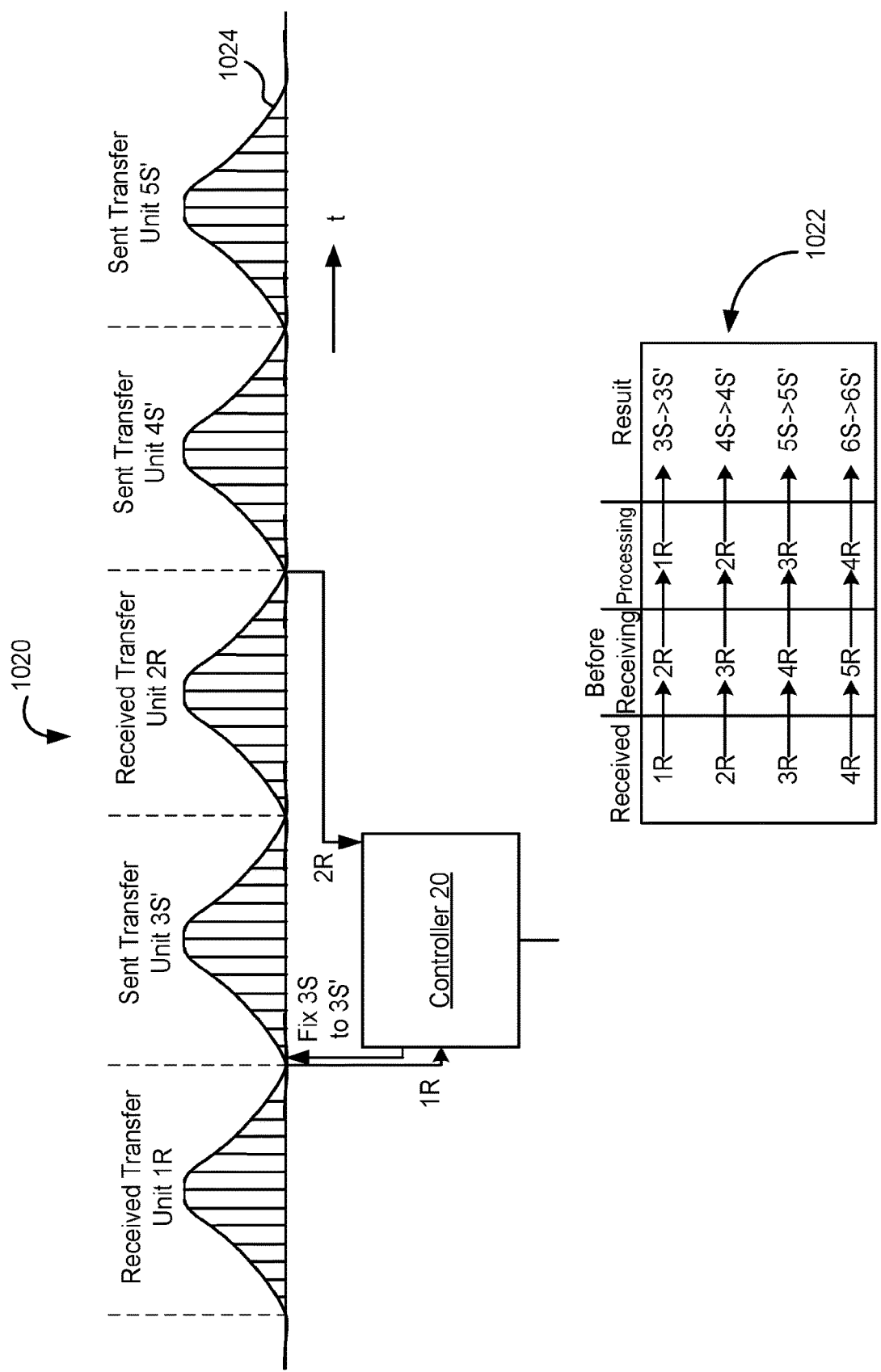
FIG. 10B is a diagram to illustrate a method for changing a value of a parameter for a state by analyzing a value of the parameter for the state before a transfer unit is being received by a receiver, in accordance with an embodiment described in the present disclosure

FIG. 10B is a diagram to illustrate an embodiment of a method for changing a value of a parameter for a state by analyzing the information associated with one or more parameters for the state. The method is illustrated using a graph 1020 and a table 1022. The graph 1020 includes a plot 1024 of transfer units versus the time t.

A processor of the controller 20, e.g., a processor of the co-controller 1, a processor of the co-controller 2, a processor of the co-controller 3, a processor of the master system controller 204, etc., processes a value of a parameter that is generated from the information associated with one or more parameters received within the transfer unit 1R by the dedicated receiver of the dedicated physical layer 23 (FIG. 1A) of the controller 20 before the dedicated receiver of the controller 20 receives within the transfer unit 2R the information associated with one or more parameters from the dedicated transmitter of the physical layer 21 of the RFG 22. For example, the co-controller 1 or the master system controller 204 processes a value of a parameter that is generated from the transfer unit 1R received by the dedicated receiver of the physical layer 202a (FIG. 2A) from the dedicated transmitter of the physical layer 203a (FIG. 2A) associated with the RFG 1 via a dedicated communication link of the physical communication medium 206a (FIG. 2A) before the dedicated receiver connected to the co-controller 1 receives the transfer unit 2R via the dedicated communication link from the dedicated transmitter associated with the RFG 1. The processor of the controller 20 determines based on a value of a parameter that is generated from the information associated with one or more parameters received within the transfer unit 1R that a value of the parameter to be sent to the RFG 22 within the transfer unit 3S is to be changed, e.g., indicated as a change from the transfer unit 3S to a transfer unit 3S' in the table 1022, etc. The changed parameter is embedded within the transfer unit 3S' by a dedicated transmitter of the physical layer 23 of the controller 20 and sent via the dedicated communication link 30 of the physical communication medium 31 to the dedicated receiver of the physical layer 21 of the RFG 22. For example, the changed parameter is embedded within the transfer unit 3S' by the dedicated transmitter of the physical layer 202a connected to the co-controller 1 and sent via the dedicated communication link of the physical communication medium 206a to the dedicated receiver of the physical layer 203a associated with the RFG 1.

Similarly, the processor of the host computer system 200 processes a value of a parameter that is generated from the information associated with one or more parameters received within the transfer unit 2R by the dedicated receiver of the physical layer 23 of the controller 20 before the dedicated receiver of the physical layer 23 receives within the transfer unit 3R the information associated with one or more parameters from the dedicated transmitter of the physical layer 21 of the RFG 22. The processor of the controller 20 determines based on the value of the parameter that is generated from the information associated with one or more parameters received within the transfer unit 2R that a value of a parameter to be sent to the RFG within the transfer unit 4S is to be changed e.g., indicated as a change from 4S to 4S' in the table 1022, etc. The changed parameter is embedded within the transfer unit 4S' by the dedicated transmitter of the physical layer 23 of the controller 20 and sent via the dedicated communication link 30 of the physical communication medium 31 (FIG. 1A) to the dedicated physical layer 21 of the RFG 22.

Moreover, similarly, the processor of the host computer system 200 processes a value of a parameter that is generated from the information associated with one or more parameters received within the transfer unit 3R by the dedicated receiver of the physical layer 23 of the controller 20 before the dedicated receiver of the physical layer 23 receives within the transfer unit 4R the information associated with one or more parameters from the dedicated transmitter of the physical layer 21 of the RFG 22. The processor of the controller 20 determines based on the value of the parameter that is generated from the information associated with one or more parameters received within the transfer unit 3R that a value of a parameter to be sent to the RFG 22 within the transfer unit 5S is to be changed e.g., indicated as a change from 5S to 5S' in the table 1022, etc. The changed parameter is embedded within the transfer unit 5S' by the dedicated transmitter of the physical layer 23 of the controller 20 and sent via the dedicated communication link 30 of the physical communication medium 31 to the dedicated physical layer 21 of the RFG 22.

Also, similarly, the processor of the host computer system 200 processes a value of a parameter that is generated from the information associated with one or more parameters received within the transfer unit 4R by the dedicated receiver of the physical layer 23 of the controller 20 before the dedicated receiver of the physical layer 23 receives within the transfer unit 5R the information associated with one or more parameters from the dedicated transmitter of the physical layer 21 of the RFG 22. The processor of the controller 20 determines based on the value of the parameter that is generated from the information associated with one or more parameters received within the transfer unit 4R that a value of a parameter to be sent to the RFG 22 within the transfer unit 6S is to be changed e.g., indicated as a change from 6S to 6S' in the table 1022, etc. The changed parameter is embedded within the transfer unit 6S' by the dedicated transmitter of the physical layer 23 of the controller 20 and sent via the dedicated communication link 30 of the physical communication medium 31 to the dedicated physical layer 21 of the RFG 22.

It should be noted that the transfer unit (x+1)R is received consecutive to the transfer unit xR, where x is an integer greater than zero. For example, there is no transfer unit received by a receiver between the transfer units 1R and 2R. Similarly, it should be noted that the transfer unit (x+1)S is sent consecutive to the transfer unit xS. For example, there is no transfer unit sent by a transmitter between the transfer units 3S and 4S.

In some embodiments, the transfer unit 2R is not received after the transfer unit 3S' is sent. For example, the transfer unit 3S' includes a parameter indicating that an RFG is to be shut down, e.g., operate at zero power, etc. In this case, the transfer unit 2R is not received by the host computer system 200.

It should further be noted that although the above-described embodiments relate to providing a modified RF signal to a lower electrode of the chuck 18 (FIG. 1A) and grounding the upper electrode 26 (FIG. 1A), in several embodiments, the modified RF signal is provided to the upper electrode 26 while the lower electrode of the chuck 18 is grounded.

In some embodiments, a processor of an RFG is referred to herein as a dedicated processor of the RFG. In various embodiments, a dedicated processor is a processor within an RFG.

Embodiments, described herein, may be practiced with various computer system configurations including hand-held hardware units, microprocessor systems, microprocessor-based or programmable consumer electronics, minicomputers, mainframe computers and the like. The embodiments, described herein, can also be practiced in distributed computing environments where tasks are performed by remote processing hardware units that are linked through a computer network.

In some embodiments, a controller is part of a system, which may be part of the above-described examples. The system includes semiconductor processing equipment, including a processing tool or tools, chamber or chambers, a platform or platforms for processing, and/or specific processing components (a wafer pedestal, a gas flow system, etc.). The system is integrated with electronics for controlling its operation before, during, and after processing of a semiconductor wafer or substrate. The electronics is referred to as the "controller," which may control various components or subparts of the system. The controller, depending on processing requirements and/or a type of the system, is programmed to control any process disclosed herein, including a delivery of process gases, temperature settings (e.g., heating and/or cooling), pressure settings, vacuum settings, power settings, RF generator settings, RF matching circuit settings, frequency settings, flow rate settings, fluid delivery settings, positional and operation settings, wafer transfers into and out of a tool and other transfer tools and/or load locks connected to or interfaced with the system.

Broadly speaking, in a variety of embodiments, the controller is defined as electronics having various integrated circuits, logic, memory, and/or software that receive instructions, issue instructions, control operation, enable cleaning operations, enable endpoint measurements, and the like. The integrated circuits include chips in the form of firmware that store program instructions, DSPs, chips defined as ASICs, PLDs, one or more microprocessors, or microcontrollers that execute program instructions (e.g., software). The program instructions are instructions communicated to the controller in the form of various individual settings (or program files), defining operational parameters for carrying out a process on or for a semiconductor wafer. The operational parameters are, in some embodiments, a part of a recipe defined by process engineers to accomplish one or more processing steps during the fabrication of one or more layers, materials, metals, oxides, silicon, silicon dioxide, surfaces, circuits, and/or dies of a wafer.

The controller, in some embodiments, is a part of or coupled to a computer that is integrated with, coupled to the system, otherwise networked to the system, or a combination thereof. For example, the controller is in a "cloud" or all or a part of a fab host computer system, which allows for remote access for wafer processing. The controller enables remote access to the system to monitor current progress of fabrication operations, examines a history of past fabrication operations, examines trends or performance metrics from a plurality of fabrication operations, to change parameters of current processing, to set processing steps to follow a current processing, or to start a new process.

In some embodiments, a remote computer (e.g. a server) provides process recipes to the system over a computer network, which includes a local network or the Internet. The remote computer includes a user interface that enables entry or programming of parameters and/or settings, which are then communicated to the system from the remote computer. In some examples, the controller receives instructions in the form of settings for processing a wafer. It should be understood that the settings are specific to a type of process to be performed on a wafer and a type of tool that the controller interfaces with or controls. Thus as described above, the controller is distributed, such as by including one or more discrete controllers that are networked together and working towards a common purpose, such as the fulfilling processes described herein. An example of a distributed controller for such purposes includes one or more integrated circuits on a chamber in communication with one or more integrated circuits located remotely (such as at a platform level or as part of a remote computer) that combine to control a process in a chamber.

Without limitation, in various embodiments, the system includes a plasma etch chamber, a deposition chamber, a spin-rinse chamber, a metal plating chamber, a clean chamber, a bevel edge etch chamber, a physical vapor deposition (PVD) chamber, a chemical vapor deposition (CVD) chamber, an atomic layer deposition (ALD) chamber, an atomic layer etch (ALE) chamber, an ion implantation chamber, a track chamber, and any other semiconductor processing chamber that is associated or used in fabrication and/or manufacturing of semiconductor wafers.

It is further noted that although the above-described operations are described with reference to a parallel plate plasma chamber, e.g., a capacitively coupled plasma chamber, etc., in some embodiments, the above-described operations apply to other types of plasma chambers, e.g., a plasma chamber including an inductively coupled plasma (ICP) reactor, a transformer coupled plasma (TCP) reactor, conductor tools, dielectric tools, a plasma chamber including an electron cyclotron resonance (ECR) reactor, etc. For example, the multiple RF generators are coupled to an inductor within the ICP plasma chamber.

As noted above, depending on a process operation to be performed by the tool, the controller communicates with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

With the above embodiments in mind, it should be understood that some of the embodiments employ various computer-implemented operations involving data stored in computer systems. These computer-implemented operations are those that manipulate physical quantities.

Some of the embodiments also relate to a hardware unit or an apparatus for performing these operations. The apparatus is specially constructed for a special purpose computer. When defined as a special purpose computer, the computer performs other processing, program execution or routines that are not part of the special purpose, while still being capable of operating for the special purpose.

In some embodiments, the operations, described herein, are performed by a computer selectively activated, or are configured by one or more computer programs stored in a computer memory, or are obtained over a computer network. When data is obtained over the computer network, the data may be processed by other computers on the computer network, e.g., a cloud of computing resources.

One or more embodiments, described herein, can also be fabricated as computer-readable code on a non-transitory computer-readable medium. The non-transitory computer-readable medium is any data storage hardware unit, e.g., a memory device, etc., that stores data, which is thereafter read by a computer system. Examples of the non-transitory computer-readable medium include hard drives, network attached storage (NAS), ROM, RAM, compact disc-ROMs (CD-ROMs), CD-recordables (CD-Rs), CD-rewritables (CD-RWs), magnetic tapes and other optical and non-optical data storage hardware units. In some embodiments, the non-transitory computer-readable medium includes a computer-readable tangible medium distributed over a network-coupled computer system so that the computer-readable code is stored and executed in a distributed fashion.

Although some method operations, described above, were presented in a specific order, it should be understood that in various embodiments, other housekeeping operations are performed in between the method operations, or the method operations are adjusted so that they occur at slightly different times, or are distributed in a system which allows the occurrence of the method operations at various intervals, or are performed in a different order than that described above.

It should further be noted that in an embodiment, one or more features from any embodiment described above are combined with one or more features of any other embodiment without departing from a scope described in various embodiments described in the present disclosure.

Although the foregoing embodiments have been described in some detail for purposes of clarity of understanding, it will be apparent that certain changes and modifications can be practiced within the scope of appended claims. Accordingly, the present embodiments are to be considered as illustrative and not restrictive, and the embodiments are not to be limited to the details given herein, but may be modified within the scope and equivalents of the appended claims.

The invention claimed is:

1. A system for facilitating a dual push, comprising:
a radio frequency (RF) generator; and
a controller coupled to the RF generator via a dedicated communication medium and a shared communication medium,
wherein the RF generator receives a configuration signal via the shared communication medium,
wherein upon receiving the configuration signal, the RF generator is configured to send via the dedicated communication medium one or more transfer units to the controller,
wherein upon receiving the one or more transfer units from the RF generator, the controller is configured to process information within the one or more transfer units to determine that one or more set points of the RF generator are to be modified,
wherein the controller is configured to send one or more transfer units including one or more modified set points via the dedicated communication medium to the RF generator.

2. The system of claim 1, wherein the controller is configured not to acknowledge the reception of the one or more transfer units from the RF generator.

3. The system of claim 1, wherein the RF generator is configured not to acknowledge a reception of the one or more transfer units sent from the controller.

4. The system of claim 1, wherein the controller is a part of a host computer system.

5. The system of claim 1, wherein the controller is coupled to another RF generator via the shared communication medium and another dedicated communication medium, wherein the controller is configured to send another configuration signal to the other RF generator, wherein upon receiving the other configuration signal, the other RF generator is configured to send via the other dedicated communication medium one or more transfer units to the controller.

6. The system of claim 1, wherein the dedicated communication medium is a cable having a first communication channel and a second communication channel, wherein the one or more transfer units sent to the controller are configured to be transferred via the first channel and the one or more transfer units sent to the RF generator are configured to be transferred via the second communication channel.

7. The system of claim 1, wherein each of the one or more transfer units sent from the RF generator to the controller is a datagram and each of the one or more transfer units sent to the controller is a datagram.

8. The system of claim 1, wherein the information within the one or more transfer units sent to the controller includes a frequency of the RF generator and a power of the RF generator.

9. The system of claim 1, wherein the one or more set points of the RF generator include a plurality of set points, and the plurality of set points include a frequency of operation of the RF generator and a power of operation of the RF generator, wherein the one or more modified set points include a plurality of set points, wherein the plurality of set points include a frequency the RF generator and a power of the RF generator.

10. A radio frequency generator for facilitating a dual push, comprising:
a processor;
a power supply coupled to the processor;
a dedicated physical layer coupled to the processor, wherein the dedicated physical layer is coupled to a controller via a dedicated communication medium;

a shared physical layer, wherein the shared physical layer is coupled to the controller via a shared communication medium;

wherein the shared physical layer is configured to receive a configuration signal from the controller via the shared communication medium, wherein in response to the reception of the configuration signal, the dedicated physical layer is configured to send via the dedicated communication medium one or more transfer units to the controller, wherein after sending the one or more transfer units, the dedicated physical layer is configured to receive one or more transfer units including one or more modified set points via the dedicated communication medium from the controller, wherein the dedicated physical layer is configured not to provide an acknowledgment of the one or more transfer units received from the controller, wherein the processor is configured to modify operation of the power supply according to the one or more modified set points.

11. The radio frequency generator of claim 10, wherein the controller is a part of a host computer system.

12. The radio frequency generator of claim 10, wherein the dedicated communication medium is a cable having a first communication channel and a second communication channel, wherein the one or more transfer units sent to the controller are configured to be transferred via the first channel and the one or more transfer units received by the dedicated physical layer are configured to be transferred via the second communication channel.

13. The radio frequency generator of claim 10, wherein each of the one or more transfer units sent from the dedicated physical layer to the controller is a datagram and each of the one or more transfer units received from the controller is a datagram.

14. The radio frequency generator of claim 10, wherein the power supply is configured to generate a radio frequency signal, wherein the one or more transfer units sent to the controller include a frequency of the radio frequency signal and a power of the RF signal.

15. The radio frequency generator of claim 10, wherein the power supply is configured to generate a radio frequency signal, wherein the one or more modified set points include a plurality of modified set points, and the plurality of modified set points include a frequency of the radio frequency signal and a power of the radio frequency signal.

16. A controller for facilitating a dual push, comprising:
a processor;
a dedicated physical layer coupled to the processor, wherein the dedicated physical layer is coupled to a radio frequency (RF) generator via a dedicated communication medium;
a shared physical layer, wherein the shared physical layer is coupled to the RF generator via a shared communication medium;
wherein the shared physical layer is configured to send a configuration signal to the RF generator via the shared communication medium,
wherein in response to sending the configuration signal, the dedicated physical layer is configured to receive via the dedicated communication medium one or more transfer units from the RF generator,
wherein the one or more transfer units received from the RF generator include information regarding an operation of the RF generator,
wherein the dedicated physical layer is configured not to provide an acknowledgment of the one or more transfer units received from the RF generator,
wherein in response to the reception of the information, the processor is configured to modify one or more set points of the RF generator to output one or more modified set points,
wherein the dedicated physical layer is configured to send one or more transfer units including the one or more modified set points via the dedicated communication medium to the RF generator,
wherein the one or more modified set points are configured to modify operation of the RF generator.

17. The controller of claim 16, wherein the dedicated communication medium is a cable having a first communication channel and a second communication channel, wherein the one or more transfer units received from the RF generator are configured to be received via the first channel and the one or more transfer units sent by the dedicated physical layer are configured to be transferred via the second communication channel.

18. The controller of claim 16, wherein each of the one or more transfer units sent from the dedicated physical layer to the RF generator is a datagram and each of the one or more transfer units received from the RF generator is a datagram.

19. The controller of claim 16, wherein the information received from the RF generator includes a frequency of a radio frequency signal generated by the RF generator and a power of the RF signal.

20. The controller of claim 16, wherein the one or more modified set points include a plurality of modified set points, wherein the plurality of modified set points include a frequency of a radio frequency signal to be generated by the RF generator and a power of the RF signal.

* * * * *